US008537171B2

(12) United States Patent
Higgins et al.

(10) Patent No.: US 8,537,171 B2
(45) Date of Patent: Sep. 17, 2013

(54) PIECEWISE NON-CAUSAL COMPRESSION AND SUBSEQUENT DECOMPRESSION OF QUANTIZED DATA FOR PROCESSING OF DECOMPRESSED DATA IN HIGHER PRECISION PROCESSING SPACE

(75) Inventors: Michael Francis Higgins, Cazadero, CA (US); Candice Hellen Brown Elliot, Santa Rosa, CA (US)

(73) Assignee: Samsung Display Co., Ltd. (KR)

( * ) Notice: Subject to any disclaimer, the term of this patent is extended or adjusted under 35 U.S.C. 154(b) by 369 days.

(21) Appl. No.: 13/107,535

(22) Filed: May 13, 2011

(65) Prior Publication Data

US 2012/0287141 A1 Nov. 15, 2012

(51) Int. Cl.
G09G 5/00 (2006.01)
G09G 5/36 (2006.01)
G06T 9/00 (2006.01)
G06K 9/36 (2006.01)
G06K 9/00 (2006.01)
H04N 11/00 (2006.01)
H04N 5/202 (2006.01)
H04N 5/14 (2006.01)
H04B 14/04 (2006.01)
G06J 1/00 (2006.01)
G06F 15/00 (2006.01)
G06F 7/38 (2006.01)
G06G 7/28 (2006.01)

(52) U.S. Cl.
USPC ............ 345/581; 345/60; 345/606; 345/610; 345/555; 345/690; 382/233; 382/251; 382/276; 382/166; 375/240.03; 375/243; 708/9; 708/203; 708/235; 708/847; 348/254; 348/671

(58) Field of Classification Search
CPC ..................................................... G09G 5/00
USPC .............. 348/14.13, 27, 395.1, 403.1, 425.2, 348/674, 254, 263, 552, 557, 560, 567–568, 348/671, 675; 358/523–525, 518–520; 345/581, 589, 590, 600–601, 605–606, 610, 345/616, 618–619, 629–630, 643, 545–548, 345/555, 567, 204, 690; 375/240.01, 240.03, 375/240.18, 240.21, 240.25, 240.26, 240.27, 375/243, 245; 708/8–9, 203–205, 208, 210–212, 235, 820, 708/845–847; 382/162, 166, 232–233, 235, 382/251–252, 254, 274, 276, 299–300, 305, 382/167
See application file for complete search history.

(56) References Cited

U.S. PATENT DOCUMENTS 5,365,465 A * 11/1994 Larson .......................... 708/204
5,528,741 A * 6/1996 Lucas ........................... 345/593
2007/0116369 A1* 5/2007 Zandi et al. ................... 382/240

(Continued)

Primary Examiner — Wesner Sajous
(74) Attorney, Agent, or Firm — Innovation Counsel LLP

(57) ABSTRACT

Nonlinear compression of high precision image data (e.g., 12-bits per subpixel) conventionally calls for a large sized lookup table (LUT). A smaller sized and tunable circuit that performs compression with piecewise linear compressing segments is disclosed. The piecewise linear data compressing process is organized so that lumping together of plural 'used' high precision value points into one corresponding low precision data value point is avoided or at least minimized. In one embodiment, the compressed data is image defining data being processed for display on a nonconventional display screen where the piecewise linearly compressed data can be stored adjacent to other image data in a frame buffer where a composite image is assembled.

43 Claims, 8 Drawing Sheets

(56) References Cited

U.S. PATENT DOCUMENTS

| | | | |
|---|---|---|---|
| 2009/0232408 A1* | 9/2009 | Meany | 382/246 |
| 2010/0128795 A1* | 5/2010 | Lynch et al. | 375/240.18 |
| 2011/0103470 A1* | 5/2011 | Demos et al. | 375/240.03 |
| 2011/0231731 A1* | 9/2011 | Gross et al. | 714/760 |

* cited by examiner

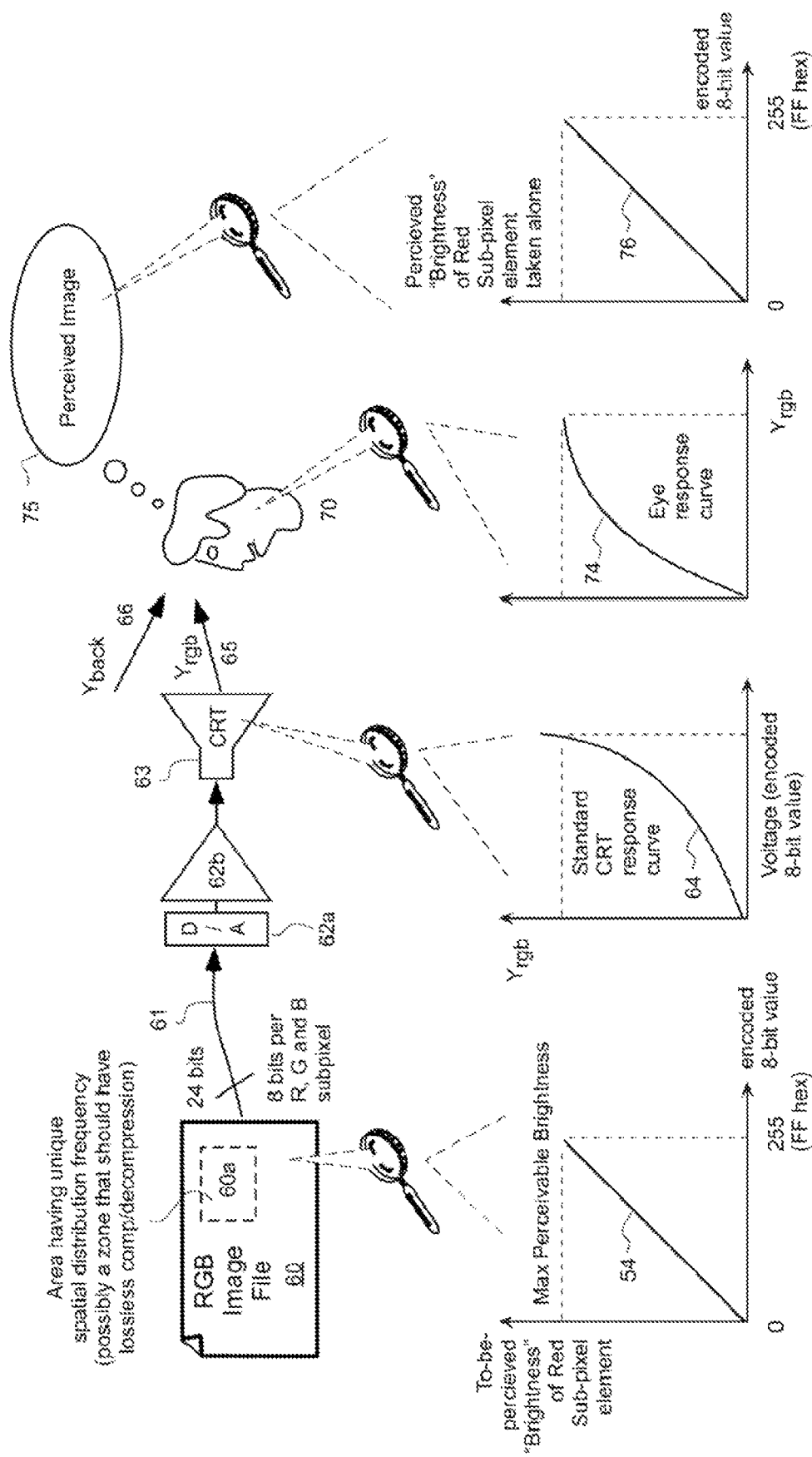

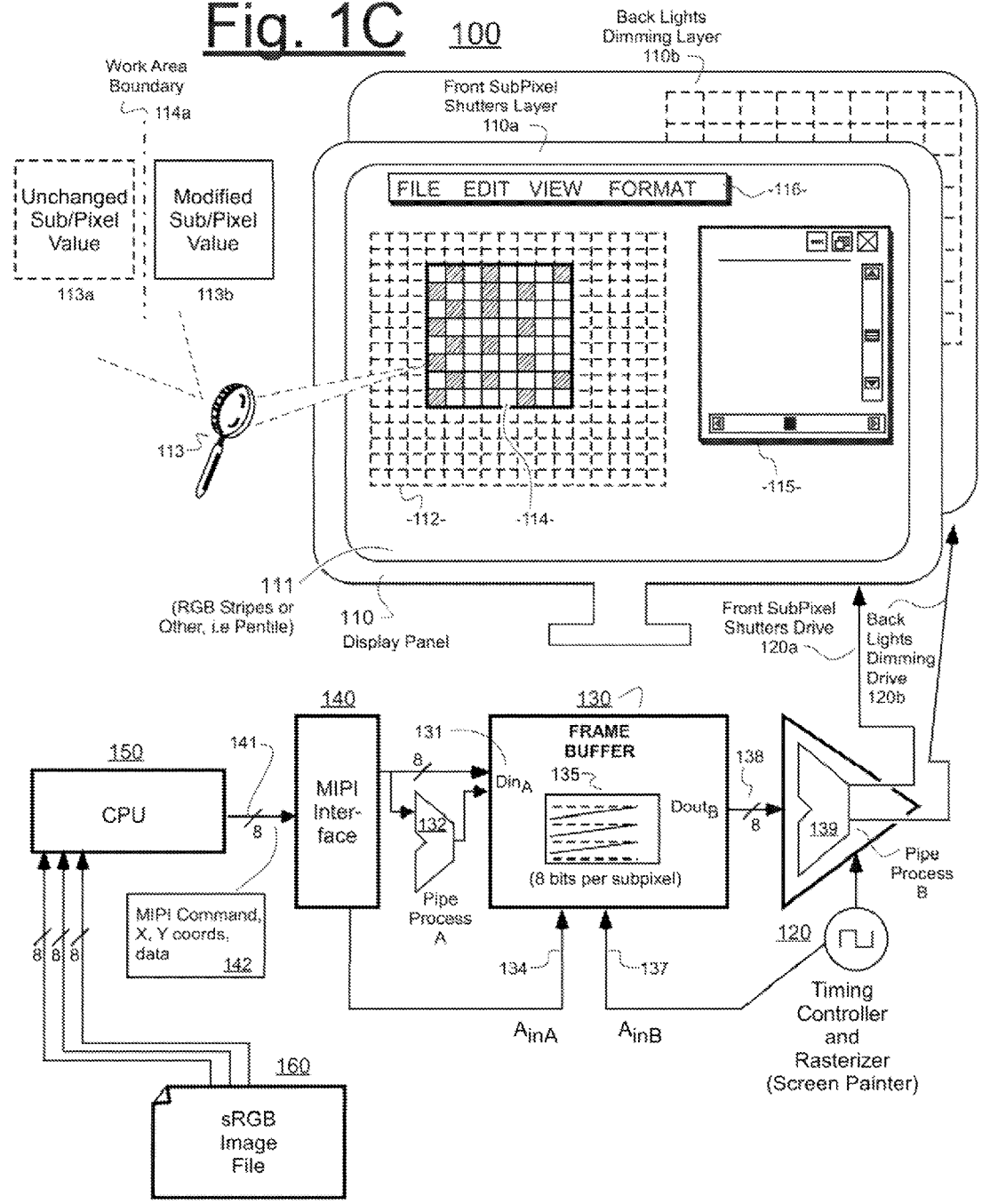

400

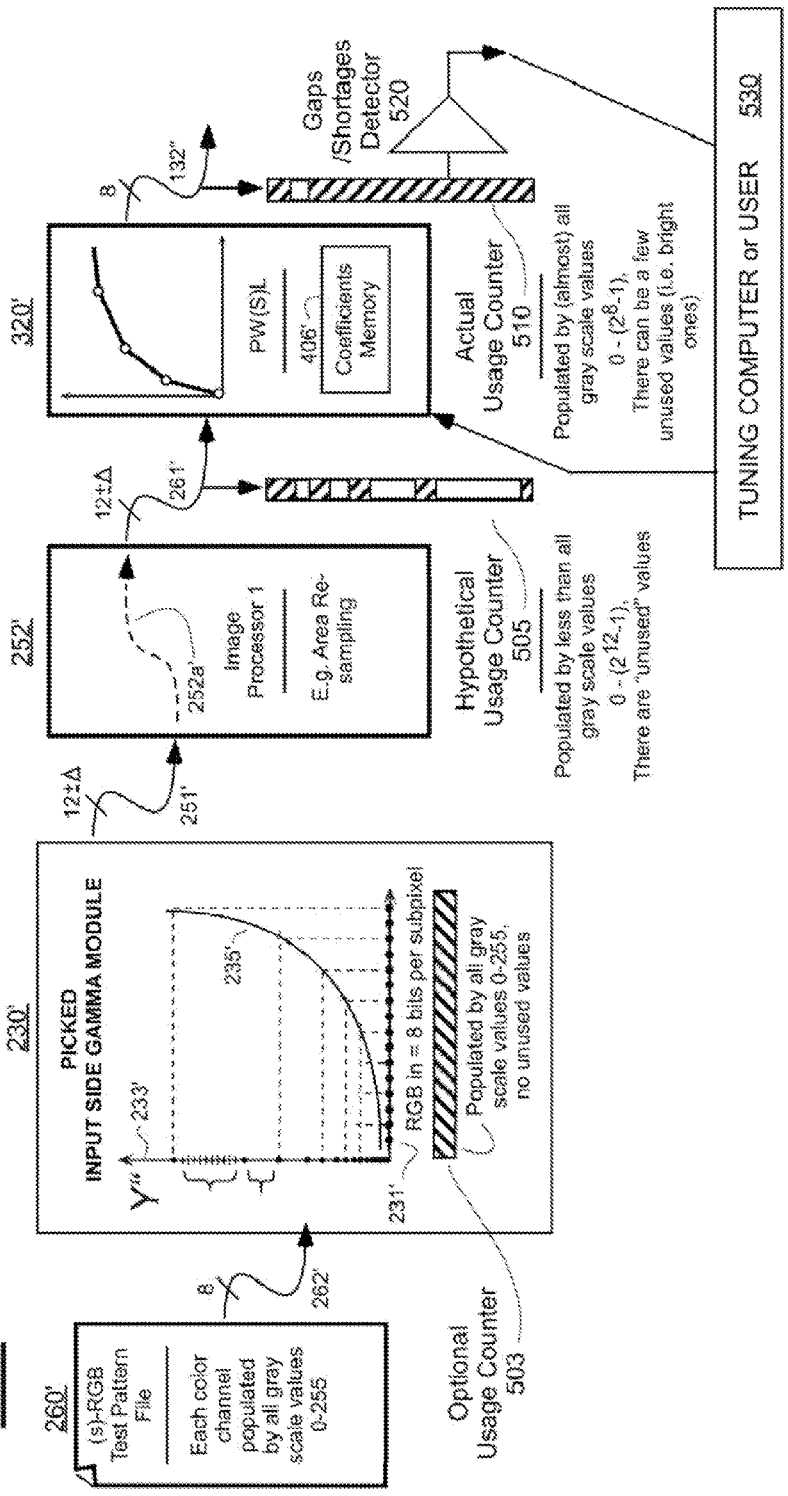

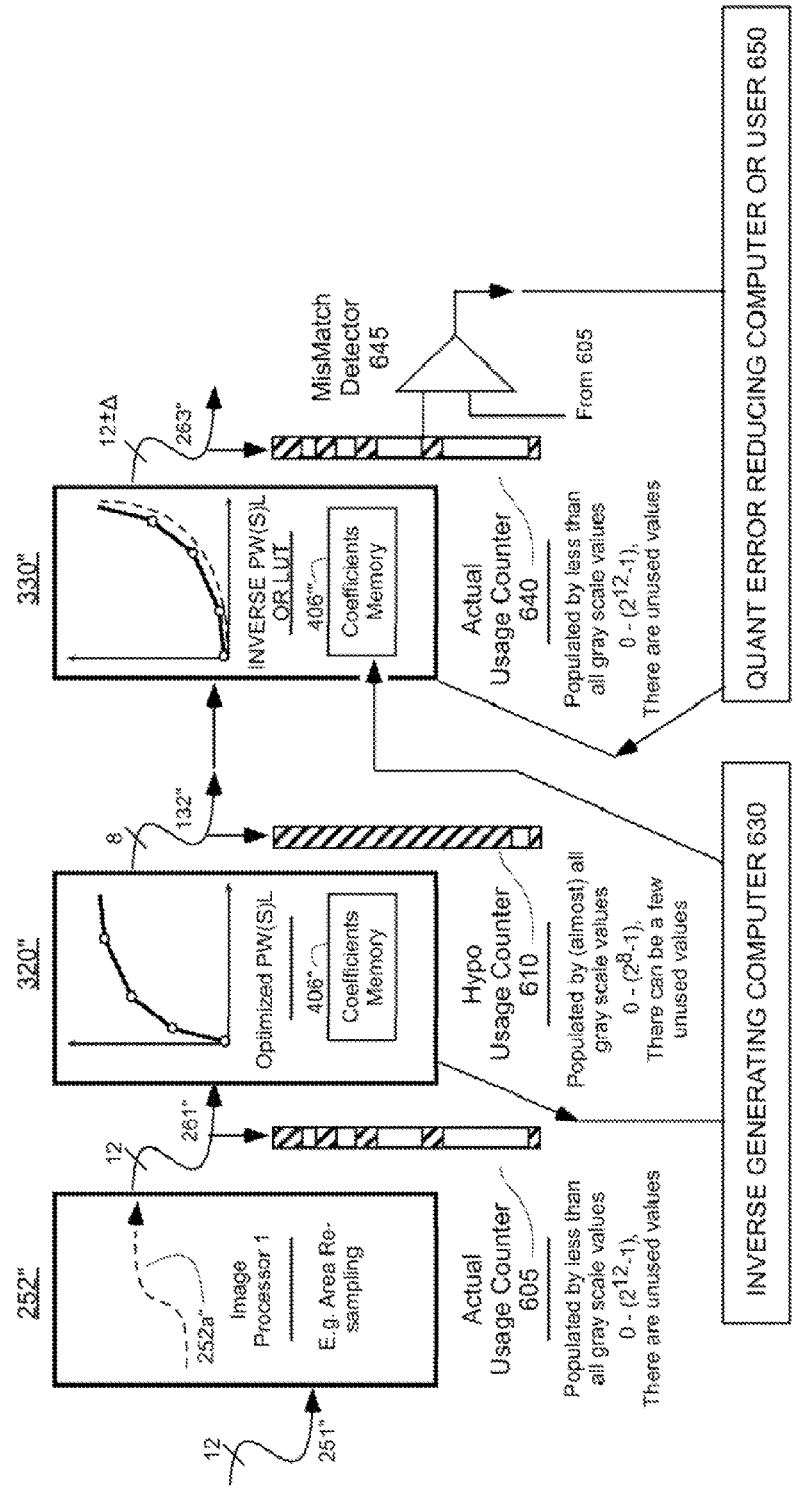

PIECEWISE NON-CAUSAL COMPRESSION AND SUBSEQUENT DECOMPRESSION OF QUANTIZED DATA FOR PROCESSING OF DECOMPRESSED DATA IN HIGHER PRECISION PROCESSING SPACE

FIELD OF DISCLOSURE

The present disclosure of invention relates generally to the field of automated processing of digitally-encoded and value representing data where the data undergoes automated re-quantization before and after processings.

More specifically, by re-quantization between processings, what is meant here is that, before processing; value-representing data is "up-mapped" (inflated) from a low precision encoding domain (one using a relatively small number of bits per uniquely represented value) to a higher precision representative domain (one using a higher number of bits per uniquely represented value), whereafter the so up-mapped data is transformationally processed (e.g., added, scaled, etc.) in the higher precision value-representative domain (HiPvRD), and the result of the transformational processing is then "down-mapped" (compressed) to a same or different, lower precision, encoded representation domain (LowPeRD) and thereafter the data is "up-mapped" (inflated) yet again for further processing.

The disclosure relates more specifically to a method of reducing circuit size and circuit complexity for automatically implementing at least one of the data up-mapping (e.g., decompression) and data down-mapping (e.g., compression) operations.

The disclosure relates even more specifically to situations where small quantization errors are unacceptable. One example is where the up-mapped, down-mapped and in-between there processed data represents display imagery including image portions having a relatively low spatial frequency of a mapped, down-mapped and in-between there processed data represents display imagery including image portions having a relatively low spatial frequency of a nature that causes even small quantization errors to stick out like sore thumbs for human observers of the imagery. The here disclosed techniques can be used in repeated work-flow processings of video data and the like as shall be detailed below.

CROSS REFERENCE TO PATENTS

The disclosures of the following U.S. patents are incorporated herein by reference:
(A) U.S. Pat. No. 6,903,754, issued Jun. 7, 2005 to Candice Hellen Brown Elliott and entitled "Arrangement of color pixels for full color imaging devices with simplified addressing";
(B) U.S. Pat. No. 6,950,115, issued Sep. 27, 2005 to Candice Hellen Brown Elliott and entitled "Color flat panel display sub-pixel arrangements and layouts";
(C) U.S. Pat. No. 7,123,277, issued Oct. 17, 2006 to Candice Hellen Brown Elliott et al. and entitled "Conversion of a sub-pixel format data to another sub-pixel data format";
(D) U.S. Pat. No. 7,221,381, issued May 22, 2007 Candice Hellen Brown Elliott et al. and entitled "Methods and systems for sub-pixel rendering with gamma adjustment";
(E) U.S. Pat. No. 7,492,379, issued Feb. 17, 2009 to Credelle et al. and entitled "Color flat panel display sub-pixel arrangements and layouts for sub-pixel rendering with increased modulation transfer function response"; and
(F) U.S. Pat. No. 7,505,053, issued Mar. 17, 2009 to Candice Hellen Brown Elliott et al. and entitled "Subpixel layouts and arrangements for high brightness displays".

DESCRIPTION OF RELATED TECHNOLOGIES

Before delving more deeply into what is meant here by a "HiPvRD" (High Precision Value-Representative Domain), by a "LowPeRD" (Low Precision encoded Representation Domain) and so on, a somewhat necessary diversion is taken into the interrelated field of image processing and the infamous "gamma" function.

Incidentally, it is to be understood that this description of related technologies section is intended to provide useful background for understanding the here disclosed technology/technologies. However, this related technologies background section may include ideas, concepts or recognitions that were not part of what was known or appreciated by those skilled in the pertinent art prior to corresponding invention dates of subject matter disclosed herein. In other words, the heading and inclusion of subject matter in this section is not to be misconstrued as an admission that material provided in this section is prior art.

Terms such as "gamma conversion" and "gamma correction" are frequently found in the literature of image processing. Regrettably such terms are often cross-mixed, misused, and thus confused between even by highly skilled artisans who are otherwise fairly well skilled in the arts of automated processing of digital and/or analog image signals. One of the reasons for this confusion and misuse is historical. Cathode ray tubes (CRT's) of the type used in old television sets generally exhibited a specific kind of nonlinear behavior in terms of the input analog voltage applied to their grid electrodes versus luminance (Y) or intensity of light rays emitted by their on-screen (on anode) phosphors. The relationship tended to be one of a simple power law function having the form: $Y=K \cdot V^{gamma}$, where K is a conversion constant, V is the analog input voltage applied to the grid, Y is the emitted luminance of a particular phosphor dot (be it a white light emitting phosphor or a colored phosphor) and gamma (also $\lambda$) is a corresponding constant which can vary from one phosphor dot to the next. Over time, artisans in the industry began to accept one generalized value of gamma or another as being a quasi-standard value in the industry, for example $\lambda=2.2$.

However that quasi-standard value quickly became lost in translation as movement to more modern technologies proceeded. With advancements in display technology, behaviors of newer CRT's and/or later-used Liquid Crystal Displays (LCD's) or other image display devices (plasma TV, etc.) began to deviate, sometimes substantially, from the historical quasi-standard behavior of say, $Y=V^{2.2}$. At the same time, the interoperativeness of legacy CRT-driving electronics called for emulation of the historical standard behavior (e.g., $Y=V^{2.2}$) at the light output end of the system. To compensate for this intermixing of modern and legacy subsystems, some artisans began to insert specific electronic signal "corrections" to their LCD or other newer display driving electronics. In other words, when the newer light outputting device (e.g., LCD) failed to provide what was deemed at that time to be the ideal quasi-standard behavior (e.g., $Y=V^{2.2}$), some artisans would insert "correction" circuitry into their LCD drive electronics to thereby emulate the quasi-standard behavior and these circuit changes were referred to as "gamma corrections". This in turn gave rise to at least two confusing uses of the term, "gamma"; one referring to the behavior of a legacy CRT and the other to circuits that try to insert "corrections" so as to make an LCD (or other newer display device) appear to behave as if it were a quasi-standard legacy CRT.

Unfortunately the story about "gamma" confusion does not end there. It turns out that by happenstance, the human visual system exhibits a nonlinear response to light intensity. The perceived "brightness" of a single light emitting point (e.g., a phosphor on a CRT) is roughly, but not exactly, the inverse of the standard CRT response function, the latter being $Y=V^{gamma}$. One might say that perceived "brightness" (Bp) is roughly, $Bp=Y^{(1/gamma)}$; or for the case of the historical quasi-standard gamma value of 2.2, $Bp=Y^{(0.455)}$. Sometimes artisans refer to this latter equation, which has to do with the human visual system and not with CRT behavior, as a "reverse" gamma conversion equation. Hence, another layer of confusion is added because when artisans mention the "gamma" word, one must worry about whether the ambiguous discussion is directed to the CRT-based "forward" gamma function or to the eye-related "reverse" gamma function or to a "correction" as between a chosen quasi-standard gamma function and behavior of a new display technology or to something else. In other words, confusion can easily arise from use of the word "gamma" as cross-mixed with other words like "function" (of the forward or reverse kind), "conversion", "correction", "transformation", "encoding", "decoding" and so forth.

Not all requantization transformations need to be of the gamma kind. To avoid such confusion, this disclosure will often use terms below such as "Representation down-mapping" (R-DowMing) and "Representation up-mapping" (R-UpMing) to refer to a class of signal mapping operations that can, but do not have to, include gamma-related mapping operations as a subset thereof.

In a perfect world the discussion about confusing terminology would end there. Unfortunately, the world has become "digitized". With that change, there arises the problem of quantization precision and quantization error generation. During arithmetic processing (e.g., adding together, scaling, etc.) of informational digital signals which "represent" certain specific values (e.g., $1111_2=F_{hex}=15_{base10}$) it is often desirable to work with digitally-encoded signals that not only uniquely represent corresponding unique values of a physical parameter (e.g., luminance) but which at the same time arithmetically represent the magnitude of the represented physical entity, say the emitted luminance (Y) of a Red pixel in the system's display device (e.g., CRT, LCD, etc.). An example of a binary encoding that does 'not' arithmetically represent the magnitude of its physical counterpart would be an encoding that says binary $1101_2$ means 200 volts and $1100_2$ means 500 volts. This is valid even though arithmetically speaking, $1101_2=13_{base10}$ and $1100_2=12_{base10}$. More specifically, although 500 volts minus 200 volts equals 300 volts, subtraction in the exemplary (and hypothetical) binary encoding domain of $1100_2$ minus $1101_2$ might yield $1F_{hex}$ where the latter binary sequence encodes for something unrelated to the intended outcome (e.g., a negative result for 500V-200V). Thus adding, subtracting, multiplying, etc. in a not-arithmetically-linearized encoding domain generally produces meaningless results and is to be avoided in cases where the digitally-encoded representations are to be arithmetically processed.

Given the above, when automated processing (e.g., arithmetic addition) of image-related data takes place, it is generally desirable to first map into a linearized, arithmetically representative domain. Typically, the mapping into the linearized, arithmetically representative domain is an up-mapping from a lower precision encoded representation domain (LowPeRD) to a higher precision value representing domain (HiPvRD). Such an up-mapping operation may at times be referred to herein as an input side gamma conversion. One reason for wanting to do such a conversion into an linearized arithmetically representative domain is because the human eye-brain complex has evolved over the millennia to respond to the summed luminances of actual light rays of real world scenes (or to actual light rays output by the CRT or other light outputting device, e.g., LCD, of an imaging system) and not to the differently-"encoded" magnitudes that instead represent voltages, currents or other electromagnetic actuations, where the latter are applied to some arbitrary node of the light outputting and image providing device (e.g., LCD). Accordingly, when various, electronically mediated effects (e.g., image blending, hue shifting etc.) are to be applied to signal-defined images within an image processing system, it is desirable to first switch into a mode (a mapping) where the manipulated signals linearly correspond to magnitude of a physical responded-to quantity (e.g., the output light intensity or luminance (Y) in a given color band such as, say Red, Blue or Green). Stated otherwise, it is generally desirable to use digitally encoded signals (DES's) that may be arithmetically added such that their arithmetic sum encodes for (represents) a sum of the corresponding luminances or corresponding other physical magnitudes of consequence. In other words, if $Y_3=Y_1+Y_2$ then at the same time the following should hold true: $DES_{Y3}=DES_{Y1}+DES_{Y2}$, where $DES_k$ means a corresponding digitally encoded signal representing a physical quantity named k (e.g., k=Y=luminance).

While linearized up-mapped data is preferred for transformational processing (e.g., adding, scaling, etc.), up-mapped data can be cumbersome to work with when it comes to storage and transmission of its signals. This is so because the up-mapped data signals tend to consume relatively larger amounts of memory and/or relatively larger amounts of transmission bandwidth. So routinely, the way to handle the situation is to: (1) store input data in a compressed (down-mapped) form; (2) automatically up-map the stored input data into an "arithmetically-linear-encoding" domain; (3) to then process the linear-encoded data; (4) to then automatically down-map the result data using a precise inverse of the up-mapping function used in step 2; (5) to thereafter store and/or transmit the down-mapped result data; and (6) to treat the stored and/or transmitted result data of step 5 as the input data of step 1, whereafter steps 2 through 6 are repeated as many times as deemed appropriate for a given application environment. Repetition of steps 1 through 6 is sometimes referred to as "work-flow processing". (Importantly, note that portion of step 3 that calls for a precise inverse of the up-mapping function used in step 2.)

It turns out that the automated down-mapping operation of step 3 (which conventionally uses a precise inverse of the up-mapping function of step 2) conventionally calls for relatively large and complex circuitry (e.g., a down-mapping LUT). It is difficult to modify that circuitry (e.g., a down-mapping LUT) in cases where unexpected changes are desired for the precision level used in the Higher Precision, value-Representing Domain (HiPvRD). Such problems will be further elaborated on below. A unique set of solutions are disclosed herein. Incidentally, mention above about the response of the human eye-brain complex to down-mapped and up-mapped image data is not superfluous and its relevance to the broader teachings of this disclosure will be expanded on below.

SUMMARY

A first recognition provided in this disclosure of invention is that; after an initial up-mapping of new input data into an "arithmetically-linear-encoding" domain (of desired precision), a subsequent down-mapping and a paired and following, re-up-mapping (into same precision domain or other) does not have to include use of a precise inverse of the initial up-mapping function.

More specifically, even if the initial up-mapping function relies on a monotonically smooth decompression function (e.g., a gamma input transformation); the subsequent down-mapping and correspondingly paired and following, re-up-mapping operations can be based on piece-wise linear functions whose breakpoint settings can be varied to compensate for peculiarities of the actually used number points in a corresponding number space. In other words, the established breakpoints of the piece-wise linear down-mapping and paired up-mapping operations need not try and meet the theoretical needs of all possible number points ("used" and "unused") in the corresponding number space. They can be custom tailored to meet merely the needs of the actually "used" number points. (The meanings of "used" and "un-used" will become clearer from an exemplary embodiment detailed below.)

In one embodiment, breakpoint settings and/or slope and run length settings (parameters) used by a piece-wise linear down-mapping operation of first circuit are automatically transmitted to a paired and following, re-up-mapping second circuit, where the re-up-mapping second circuit automatically reconfigures itself in accordance with the received down-mapping operation parameters and a supplied precision indication signal that indicates what precision level is to be used in the higher precision value representing domain (HiPvRD) to which the re-up-mapping operation will up-map its input data. The latter process (that which includes transmitting the down-mapping parameters) can be particularly useful when workflow data has to be transmitted via limited bandwidth transmission channels from one work center to a remote other work center and/or when workflow data has to be stored in a memory means of limited capacity.

Structures and methods are disclosed herein for how to provide piece-wise linear pairings of down-mapping operations and re-up-mapping operations where, for example the down-mapping is from a 12-bits per word domain to an 8-bits per word (or per subpixel) domain and the subsequent re-up-mapping is to a 13-bits per word domain. It will also be disclosed herein how to automatically perform the 12 bit to 8 bit down-mapping operation without need for a lookup table (LUT) circuit having 12 or more address input bits. It will further be disclosed herein how to automatically perform a yet more downstream, 13 bit to 9 bit down-mapping operation without need for a lookup table (LUT) circuit having 13 or more address input bits.

In accordance with one aspect of the disclosure, a piece-wise linear (PWL) compressor is provided with programmable breakpoint registers storing breakpoint values, where each respective breakpoint value indicates where in an input number space, a first linear compression algorithm terminates and another one (not necessarily all of them being linear) takes over. Another set of registers store coefficients (e.g., slope and y-intercept) for the different linear compression algorithms. The ability to adjust breakpoint values and coefficients of compression algorithms (and counterpart decompression ones) is useful for a set of reasons too complex to immediately explain here. It will be seen in the detailed discussion below that there is a concept of "used" and "unused" number points or number values on a high precision number line (or in a precision numbers domain). It will be seen below how these "used" and "unused" points or values interact with the set breakpoint values and with the chosen compression algorithm coefficients (e.g., slopes) to provide a functionally usable compression circuit that is substantially smaller in size and of lesser complexity than a comparable lookup table (LUT) having the same number of address input bits (e.g., 12-bits for when down-mapping from a 12-bits per luminance value domain to an 8-bits luminance level encoding domain).

In accordance with another aspect of the disclosure, a paired set of machine-implemented PWL compression and PWL decompression operations are carried out respectively by automated machine means before and after high precision data is stored and/or transmitted but not arithmetically processed in the interim. The utilized PWL compression and PWL decompression algorithms are custom tailored to correspond to clusterings of actually "used" data points of the higher precision, value representing domain (HiPvRD). In one image processing system embodiment, a standard sized frame buffer (e.g., 8-bits per stored word) is used to store, in compressed form, luminance data words (e.g., representing 12-bits wide Y values) that have been arithmetically pre-processed and may need to be reconstituted upon readout as same precision luminance data words (e.g., 12-bits/subpixel) so that they can be further arithmetically processed. The standard sized frame buffer (e.g., 8-bits per stored word) can store side by side in address space, subpixel values that have been subjected to compression and those that have not been so subjected. In one embodiment, the piece-wise linear (PWL) compression algorithm roughly mimics (although it does not have to) an output side gamma function such as the industry conventional sRGB output side gamma function. This may enable LCD localized backlight dimming controls to work with compressed frame buffer data as their inputs.

In one embodiment, a noncausal and substantially piece-wise linear digital data compressor circuit roughly mimics the output-side gamma conversion function used (at least implicitly) for generating so-called sRGB encoded image data. The piece-wise linear compressor outputs its compressed data to a system frame buffer that stores image data in an 8 bits per subpixel format. In one embodiment, the system frame buffer comprises one or more monolithic integrated circuits (IC's) designed to function as frame buffer memory and thus provide high speed and high density storage of image data at 8 bits per data word. The piece-wise linear compressor can be compactly integrated within one of those monolithic integrated circuits (IC's) or in another IC that connects to the system frame buffer. If needed, data decompression can be also realized with use of a piece-wise linear data decompressor design that roughly mimics an input-side gamma conversion function. The piece-wise linear data decompressor may be structured to counter for compression quantization errors that may have been introduced by the gamma mimicking PWL compressor. The error-countering decompressor re-inflates the temporarily compressed and stored image data into the linearized, high precision format, of for example, 12 bits per subpixel so that it can be used in further processing of high precision image linearized data after it having been temporarily compressed nonlinearly and stored in the system frame buffer and thereafter reinflated. In one embodiment, that post-frame-buffer processing includes dynamic formation of local backlight dimming control signals.

Other aspects of the disclosure will become apparent from the below detailed description.

BRIEF DESCRIPTION OF THE DRAWINGS

The below detailed description section makes reference to the accompanying drawings, in which:

FIG. 1A is a block diagram used to explain some basics of legacy CRT gamma conversion;

FIG. 1C is a block diagram of a more complex display system that includes a system frame buffer and one or more pre-storage and post-storage image data reprocessing engines;

FIG. 5A shows a system for tuning a PWSL compression mapper such as one constructed according to FIG. 4, where the tuning seeks to eliminate or minimize information-destroying gaps;

FIG. 5B illustrates a tuning algorithm usable by the tuning system of FIG. 5A;

FIG. 6A shows a further system for reducing error in an inverse decompressor that operates in conjunction with a PWSL compressor such as one constructed according to FIG. 4; and FIG. 6B illustrates an error reducing algorithm usable by the reducing system of FIG. 6A.

DETAILED DESCRIPTION

Figure 1B:
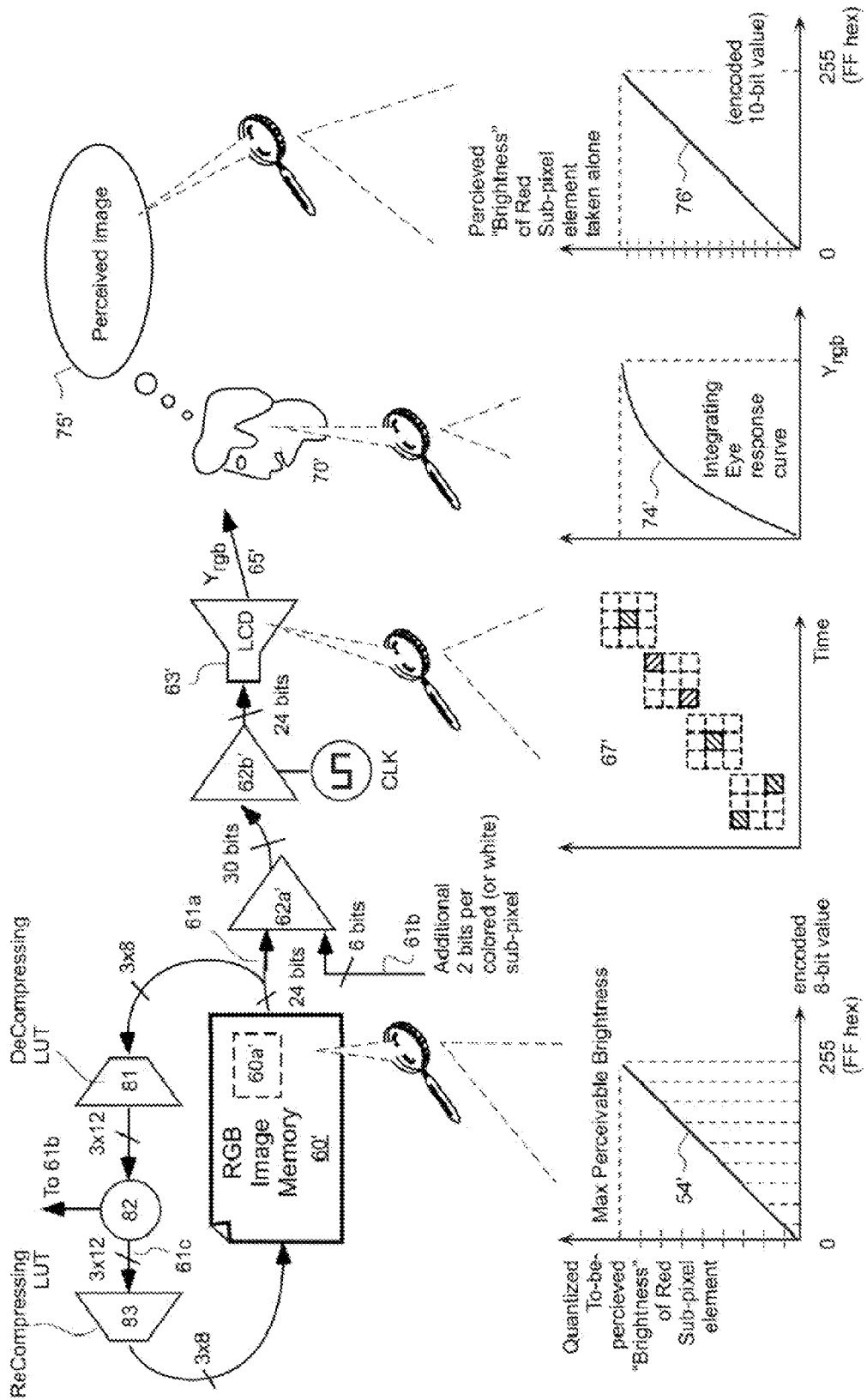
FIG. 1B is a block diagram used to explain some basics of digital quantization effects and of temporal dithering effects.

Referring to FIG. 1A, shown is a visual depiction for further explaining some of the concepts introduced above. In a conventional image-processing system 50, a conventional image-defining data file 60 stores R, G and B subpixel data in the form of one individually addressable 8-bit word for each subpixel or one individually addressable 24-bit word for each RGB pixel. Each conventional pixel is thereby defined by a respective 24 bits of stored data. The defined image (not shown) can have attributes beyond that of a resolution of 24 bits-per-pixel. For example, the spatial distribution or clustering of certain digital sequence patterns (e.g., only blue hues in a sky area 60a) in corresponding area portions of the image area can lead to other digital sequence patterns being left out (not used) in those portions of the image area. If a quantization error causes a left-out pattern to suddenly appear in an area otherwise devoid of it, say a single yellow pixel in a field of only blues, that one error may stick out as an easily seen error even if it is just one out of many thousands of pixels whose quantization or re-quantization was badly handled. (Incidentally, an image area that has, say, only all blue hues or certain repeated pattern of colors may be referred to as an image area of low spatial frequency.) It will be seen later why this spatial zone 60a of the image-defining data file 60 may require special attention (assurance of lossless processing) if data extracted from the file 60 is somehow compressed and then decompressed before being provided to the next-described, D/A converter 62a.

In the system 50 of FIG. 1A, the stored, 24 bits-per-pixel data of memory area (e.g., file) 60 is transmitted as serial pixel data 61 sequentially to a digital-to-analog (D/A) converter 62a. An output of the D/A converter 62a connects to an analog CRT driving circuit (e.g., amplifier 62b) which drives a legacy CRT 63 disposed in an office, home or other ambient environment. The legacy CRT 63 has an input versus output response curve 64 that, in this case, ideally matches an accepted quasi-standard gamma function (e.g., $Y=V^{2.2}$). Here, V is input grid voltage and Y is output luminance. A human viewer 70 observes light rays 65 having respective RGB luminosities, $Y_{rgb}$ emanating from the phosphor dots of the legacy CRT 63. The human viewer 70 may also be subject to other light rays 66 emanating from the ambient background. Without wishing to be bound to any specific theory, it is believed that the human eye-brain complex leads the viewer 70 to perceiving a certain "brightness" as being associated with each glowing phosphor dot on the CRT screen. Experiments carried out by others seem to indicate that response by the human eye to increasing levels of luminosity (plot 74) is nonlinear and it decreases in sensitivity as magnitude of luminance (Yrgb) increases. This human eye response curve 74 is roughly (not exactly) the inverse of the quasi-standard gamma function response curve (plot 64) provided by the legacy CRT 63. Thus, when a sequential set of brightness code values (X-axis of graph 54) are passed serially through the transform functions provided by the plots identified as 64 and 74 in the recited order, the human observer generally perceives a sequence of linearly increasing brightnesses per what is shown in the perception outcome plot 76 (in this case for the Red subpixel taken by itself, where other colors may have their own, similar but separate transform lines and curves). Of course, perceived brightness 75 can be a complex function of many variables including spatial and temporal integrations. More specifically, the spatial frequency aspect mentioned above with regard to image subarea 60a is included as part of the complex function. FIG. 1A does not pretend to be a definitive theory about how the entire human eye-brain visual complex operates. It merely provides a simplified visual depiction of some of the more simple and basic concepts. Those not familiar with these concepts may benefit from referring back to FIG. 1a on occasion as the discussion progresses into more complex extensions of the basic principles.

Referring next to FIG. 1B, shown is a visual depiction of some further concepts that extend upon of those of FIG. 1A. In this illustrated embodiment 80, the display device 63' is a digitally driven LCD. The drive circuitry, 62a'-62b', receives not only a sequence 61a of 24-bit RGB data words from an RGB memory 60' (which memory block 60' stores input image data), but the same circuitry, 62a'-62b' also receives subpixel augmentation data 61b of 2-bits per subpixel from another source (not shown here and described in more detail below). In this example 80, the purpose of the extra 2-bits per subpixel augmentation data 61b is to increase the number of unique gray scales that the observer 70' perceives within each of the R, G and B color planes. The two extra bits 61b can increase perceived luminance resolution by a factor of four ($2^2=4$) for each color plane (e.g., R, G, B; but could also include White and/or Cyan). Typically, when there are just 8-bits of data per R or G or B subpixel, the number of uniquely displayable gray scales in that color plane is limited to just 256 discrete levels per subpixel (with these discrete gray scale magnitudes being identified as code values 0 to 255 in plot 54'). However, by taking advantage of spatial and temporal image integration behaviors of the human visual system, a finer set of discrete gray scales can be caused to be perceived. In the illustrated example, symmetrical 3×3 patterns of nine 8-bit levels are sequentially displayed in rapid succession over time and in a same spot on the screen and in accordance with graph 67'. The 3×3 pattern may be seen to rotate around the middle subpixel of the 3×3 array of subpixels. The human visual system may respond to this rotation by perceiving the central subpixel as being the center of a perceived luminance point and as having a finer gray scale value and a higher spatial resolution than that provided by the 256 quantized steps afforded by plot 54' taken alone and by the just 9 subpixel cells of the 3×3 array. Such temporal-spatial processing or "dithering" is just one example of many possible techniques that may be employed to cause an LCD panel 63' to appear to have a much finer range of used gray scale levels and a higher spatial resolution than what might be possible with just 8 bits of data being provided for just a conventional R, G and B subpixeled domain. Local backlight dimming control (not shown in FIG. 1B) may also be employed to create a final perception 75' of higher resolution images than might be provided if the limited number of subpixels in the LCD 63' were driven solely on the basis of 8-bits per subpixel without giving consideration to temporal and/or spatial cross-integration factors.

In one embodiment, the two augmentation bits added per subpixel (by way of line 61b) of FIG. 1B are obtained by converting the digitally encoded, 8-bits per subpixel original values of file 60' into 12-bits per subpixel linearized luminance values (Y), analyzing these linearized values in a spatially and/or temporally expanded space (where the latter temporal case assumes multiple frames being stored in memory buffer 60') and then responsively generating the two augmentation bits per subpixel (line 61b) by using a data pre-processing module 82 that feeds its output to line 61b. It should be observed that converting the 8-bits per subpixel data of file 60' into 12-bits per subpixel luminance values (Y) calls for a decompression operation 81 (an up-mapping operation), not a compression operation. However, a second output 61c of pre-processing module 82 may need to be compressed and stored back into memory unit 60'. Incidentally, part of the data stored back into memory unit 60' may define a special spatial zone 60a' (similar to 60a of FIG. 1A) that should be subjected only to lossless decompression (81) and then lossless recompression (83) because a lossy compression process (83) in at least that area can lead to creation of easily spotted and undesired, quantization error artifacts.

Compression (83) is significantly different from decompression (or data inflation 81) because in a decompression operation, one starts with a relatively small number of input bits per input sample (e.g., 8 bits per colored subpixel) and outputs a larger number of bits per sample point. The relatively small number of input bits can be conveniently applied to the address input port of a relatively small-sized decompression lookup table (LUT 81). The DeComp LUT 81 then produces the higher precision; wider output words (e.g., 12-bits per output word) which can be arithmetically processed by module 82.

On the other hand, compression or re-compression of data (such as that to be performed by ReComp LUT 83 of FIG. 1B, entails receiving the greater number, e.g., 12 bits per subpixel, of data output from processing unit 82 and recompressing it back to a 8 bits per colored subpixel (8 b/sp) format. Although the difference between 8 input bits and 12 input bits is a mere 4 bits, the difference in size of the LUT circuitry needed to handle the high precision input signals (12 b/sp) is roughly an exponential of 4; e.g., $2^4$ or about 16 times bigger. In other words, the proposed use of a follow-on compression LUT (83) in FIG. 1B to convert the 12 b/sp data produced by processing unit 82 back into compressed data (3×8 bits for return into memory 60') is roughly 16 times bigger, per color plane, in terms of die space consumed than is the decompression LUT (81) that decodes the 8 input bits (61a) in the first place into 12-bits per color plane data. That circuit size increase factor of 16 is a significant difference. Circuit space available on an integrated circuit (IC) can be scarce. Moreover, power consumed (to drive the LUT's input decoding circuitry) can significantly and disadvantageously increase when circuit size for performing such down-mapping operations (compression) increases. Note in FIG. 1B that there would have to be not one, but rather 3 such large decompression LUTs (83) in an RGB system; one for each of the R, G and B primary colors. If there were more color planes (e.g., RGBW and/or other or additional luminosity planes) to be processed, then yet more large-sized recompression LUTs (like 83) may be needed. Such a situation is problematic.

Let it be assumed for a moment, that the image data pre-processing module 82 of FIG. 1B was modified to output 13b/sp rather than the illustrated 12-bits per subpixel on bus 61c. The per word storage size of memory buffer 60' remains unchanged however. In such a case, an even large sized compression LUT 83 would need to be implemented as a hardwired circuit in silicon. It would be approximately 32 times large in consumed circuit area than decompression unit 81 for each color plane. This would be a big problem. The present disclosure provides a solution.

Before advancing to the solution, an explanation of yet another system 100, as shown in FIG. 1C is provided. In the illustrated system 100, a flat panel image display device 110 (e.g., LCD) is provided as having a display screen 111 populated by differently colored subpixels. The subpixels may be organized to form conventional RGB stripes (e.g., vertical regions of respective Red, Green and Blue light emitting subpixels) or according to other organizations including the so-called RGBRG Pentile™ organization or according to different versions of RGBW organizations. The respective brightness levels of these subpixels may be supplemented by use of dynamically changing localized backlight dimming techniques in cases where the display 110 is a dynamically backlit liquid crystal display (dyb-LCD). More particularly, in one embodiment, the display panel 110 has a first layer 110a of subpixel shutters implemented in the form of liquid crystal light valves near its front (each being covered by an appropriate color filter or a white light pass-through cover) and a second layer 110b of backlight dimming units (e.g., individually controllable LED white light sources) near its back. In one embodiment, each independently controllable backlighting unit or block in back layer 110b aligns under a prespecified and corresponding plurality of pixels of the first or upper layer 110a. The drive signals applied to such a multi-layer display panel 110a/110b include first control signals 120a that drive the front shutters (optionally with use of temporal and spatial integration techniques) and second control signals 120b that drive the dynamically alterable backlight dimming units, where the combination of effects defines the displayed image perceived by a user of the system 100.

Illustrated in display area or region 112 of the front panel 110a is a representation of a first rectangular or other shaped area populated by differently controllable and independently addressable subpixel shutters. Smaller area 114 represents a subset area (e.g., square area) within larger area 112. Subset area 114 can be a region whose frame buffer data is being currently modified by one or more image data processing devices (e.g., 150-140-132 of FIG. 1C or the "pre-processor" 82 of FIG. 1B). Incidentally, in FIG. 1C, embracing hyphens (e.g., -112-) are used for reference numbers that do not appear on the display screen. The display screen 111 can have a variety of individually-modifiable image objects displayed thereon. For example, adjacent area 115 may represent a floating window or a floating frame whose internal image objects are determined by a respective first executing computer program running in CPU 150 where that first program is assigned to controlling the contents of just that image window or frame 115. At the same time, another concurrently running computer program or thread may define the contents of another window or frame. For example, taskbar 116 might represent another such floating image frame whose contents can be changed depending on user action and/or program action. For example, if the computer's user brings a cursor (which on-screen cursor is not shown) over one of the taskbar items (e.g. FILE), then a submenu may pop out or unfurl from the main taskbar 116 to reveal additional display items (e.g., Save, Save File As, . . . , etc.). At the time that this submenu unfurling action takes place under taskbar 116, the interior of the adjacent window or frame 115 may remain unchanged. Accordingly, it is seen that different areas of the display screen 111 may need to be changed and repainted or not with changing image objects at different times while other areas of the screen display may be held static. Since dynamic localized backlight dimming depends on the composite of image objects presented on the front layer 110a of the display panel, it is often necessary to form and store the entire composite image in the frame buffer (130, to be described shortly) before formulation of backlight control signals (120b) can take place.

In FIG. 1C, a hypothetical magnifier symbol 113 is used to focus on a border area between a currently being-modified subset region 114 and the encompassing bigger area 112 of the panel's front display layer 110a. As mentioned above, one or more particular image data processing engines (e.g., 132) may be currently modifying subpixel brightness levels within the frame buffer region that corresponds to area 114 while leaving unchanged the remaining subpixels of encompassing larger area 112. This leads to the need for a non-causal compression process. The concept is further explained by magnification view 113 showing unchanged subpixel 113a being spatially positioned immediately adjacent to the now-being-modified subpixel 113b, where the two are hypothetically separated from each other by the variable work area boundary, 114a. Movable boundary line 114a separates subarea 114 from the static surrounding portions of subsuming area 112. On the screen 111 itself, the modification to the luminance data of subpixel unit 113b may appear as a change of displayed subpixel brightness while the intensity of light emitted out of adjacent subpixel 113a remains unchanged. Of course, at about the same time, somewhere in the system memory, corresponding memory areas are respectively storing changed and unchanged subpixel drive values (brightness codes) for respectively defining the displayed subpixel brightness drive levels of regions 113b and 113a. These stored, changed and unchanged subpixel values are also understood to be represented by adjacent areas 113b and 113a of FIG. 1C. The point made here is that, while the subpixel drive value 113b is being currently modified by action of one or more of the image processing engines (e.g., devices 150, 140 and/or 132, 139), the stored subpixel drive value for area 113a remains unchanged. Therefore, the stored subpixel value representing the desired brightness of subpixel 113a in the frame buffer 130 cannot be dependent (historically or otherwise) on the value stored in frame buffer for representing the brightness of subpixel 113b and vise versa. Stated otherwise, the subpixel representing values stored in adjacent memory locations of frame buffer 130 cannot be causally dependent on one another. Each stored data value has to be capable of being independently decompressed, modified, re-compressed and stored again.

Because subpixels 113a and 113b are currently displayed on screen 111, the data values representing these displayed subpixels 113a and 113b are stored in a raster-scanned region 135 of the system frame buffer 130. By raster-scanned region, it is meant here that a display-panels-driving, image painter circuit 120 (which circuit is also referred herein to as a timing controller 120 or a rasterizer 120) periodically reads through the memory locations of the rasterized region 135 using a corresponding, reading address driving bus 137 ($A_{inB}$) so as to thereby sweep in a left to right fashion across each row of the screen 111 and then, in top to bottom fashion down the rows of image data represented by region 135, thereby painting the currently displayed image on screen 111. In one example, the data within the raster scanned region 135 can be a direct copy of sRGB data originally obtained from a corresponding sRGB image file 160 (where file 160 may be stored on a hard magnetic drive or in other system memory). In another example, the data within the raster scanned region 135 can include pre-processed and reprocessed image data that has been subjected to one or more pairs of decompression and re-compression operations.

The data in file 160 can be roughly the same as the RGB data in file 60 of FIG. 1A. In other words, despite the complex appearance of FIG. 1C, system 100 should still be able to implement a simple operation, such as fetching the sRGB data from file 160 and sequentially applying it without change to panel driver 120 so as to produce a corresponding image on display panel 110. In such a case, the illustrated CPU 150 (central processing unit) of FIG. 1C may have copied the original data directly from file 160 and commanded an included MIPI (Mobile Industry Processor Interface) device 140 to store the copied data directly as is, into a specified region 135 of frame buffer 130, whereupon the automated image painter 120 picks it up and with each frame refresh clock, paints what is in the frame buffer 130 onto the screen 110. The standard CRT response behavior 64 of FIG. 1A may be assumed to be inherently carried out by the combination of driver 120 and panel 110. The human vision system response behavior 74 of FIG. 1A may be assumed to be inherently carried out by the human viewer (not shown) who is viewing screen 110.

In order for such direct copying and display of image data to occur as intended, one of two things should be true: either the driven display panel 110 has its front layer subpixels 112 organized according to a conventional RGB stripes organization assumed by the sRGB standard file format, or the data of file 160 is re-organized to match a peculiar organization of subpixels on screen 111. And of course, it is assumed that the display device 110 is not making use of selective backlight dimming (made possible by back layer 110b) in this example. However, if the case is otherwise; meaning that subpixels on display panel 110 are not organized according to the conventional RGB stripes organization and yet data in file 160 is so organized, the data of input file 160 has to be re-structured on the fly before it can be stored in the frame buffer 130 and thereafter automatically picked up by the screen painter 120 for display on the unconventionally structured screen. Examples of nonstandard subpixel organizations include the RGBRG Pentile™ configuration disclosed in the above-incorporated patents or an RGBW repeating group configuration or some other non-RGB stripes unconventional configuration. When one of these unconventional configurations of subpixels is present on the display device screen 111, the image data obtained from the sRGB image file 160 often must be modified (pre-processed) before it can be appropriately deposited into the frame buffer 130 and soon thereafter displayed on the nonconventional display panel 110a/110b. Accordingly, as shown in FIG. 1C, one of possible data flow paths for data fetched from the sRGB image file 160 is through the MIPI device 140 and also through a pre-processing pipeline engine A (132) before the data is stored in the frame buffer 130. The pre-processing (132) carried out by engine A may, and often does call for on-the-fly, linearizing decompression of the sRGB image brightness data (e.g., 8-bits per subpixel) in file 160 into luminance values of a higher precision (e.g., 12-bits per subpixel). After the pre-processing (132) completes, the pre-processed data is compressed and stored into an appropriate region of frame buffer 130 and soon thereafter retrieved by the screen painter 120. In some instances, the pre-processed, re-compressed, stored and later retrieved data is again decompressed and passed through a post-processing pipeline engine B (139) which engine B makes appropriate usage of that decompressed and thus linearized image data. An example of using the second-time decompressed data is where the additional dithering bits (e.g., 61b of FIG. 1B) are to be produced and used to carry out spatial and/or temporal dithering of small areas within the displayed image.

It is to be understood that FIG. 1C shows merely one example of how image data (e.g., from sRGB image file 160) may need to be a flowing-through stream of on-the-fly processed data that may be subject to processing by a plurality of data processors for different reasons and at different times. In terms of a more detailed example, a given row or block's worth of 8-bits/subpixel RGB data can be fetched as is by CPU 150 and sent to the MIPI interface device 140 together with a command 142 that indicates where in the frame buffer (e.g., a region corresponding to screen block 114) that CPU identified data is to be directed. This identified block of data can then be forwarded either directly into the $D_{inA}$ data input port of frame buffer 130 for writing or it may be first redirected through pre-processing pipeline engine 132 before being stored in the frame buffer. During its optional trip through the pre-processing pipeline engine 132, the streaming-through block's worth (e.g., 114) of 8-bits/subpixel RGB data may have to be decompressed into linearized 12-bits/subpixel format, processed as such and then re-compressed into 8-bits/subpixel format. Later the once-transformed data may need to be decompressed again and processed by another engine B (139) and perhaps compressed again. In other words, during workflow, image data is repeatedly decompressed, processed (e.g., arithmetically processed) and recompressed. The compression and re-compression step presents a problem as explained above.

It is to be understood that the exemplary flow of image signals in FIG. 1C is provided for illustrating a more general concept, namely, that during a real time data fetch and store operation, the image data may have to be decompressed on-the-fly, processed in decompressed form, and then re-compressed prior to storage in a memory of limited word size such as the 8-bits per word frame buffer 130 where all this may have to happen quickly, in a vertical frame refresh period of the display system. In one embodiment, the re-compressed data may have to be decompressed on-the-fly multiple times so as to provide information for controlling temporal/spatial dithering and/or dynamic backlight dimming operations of the display system 100. In various possible embodiments, the sRGB image file data 160 may be stored in DRAM main memory or a in hard drive of an encompassing computer apparatus and the various data movements may be multiplexed over shared data busses (not shown). Although FIG. 1C shows all data flowing into raster-scanned area 135 of the frame buffer, in an alternate embodiment, some pipeline processed data may first flow into a non-raster-scanned region (not shown) of a frame buffer and then through a second pre-processing engine (similar to 132) before being stored in the raster-scanned area 135 of the main frame buffer and then ultimately painted onto the screen 111 by the image painter mechanism 120 (which includes post-processor 139). Other alternatives are possible.

While in one embodiment, linearized luminance-representing image data is always provided in 12-bits/subpixel format, there is nothing magical about the 12 bits per image unit level of precision. In other embodiments, it may be sufficient to represent one or more of R, G, B or other color luminance information (e.g., white luminance) as 10-bits wide apiece data items. In yet other embodiments, 12-bits/subpixel may be insufficient and one or more of R, G, B or other color luminance information (e.g., cyan) may have to be represented as 13-bits wide (or wider) data items. (It is noted that the 12-bits per subpixel width is called for by Hollywood's Digital Cinema standard as an example and thus it serves as a nominal number for examples given herein.)

The reasons for desiring larger or smaller numbers of bits per subpixel (higher and lower precision per digital data word) may be many fold and may include a desire to not waste memory or other system resources by using too large of a precision when not needed and a desire to not lose vital information or introduce noticeable image artifacts due to truncation or other data quantization errors. Also when performing linear arithmetic operations on luminance values it may be important to distinguishably represent two different levels of luminance or of another physical parameter so that addition of such numbers does not overflow. (If there are not enough bits for distinction's sake, then two different levels of luminance might inadvertently become lumped together under one representing pattern of ones and zeroes—and their distinction will be irreversibly lost.) In some embodiments, the need for larger numbers of bits per subpixel (higher precision per digital data word) may alternatively arise from a need to add fractional parts of different pixel areas—something that may happen in area resampling operations and subpixel sharpening or smoothing filter operations.

Figure 2:
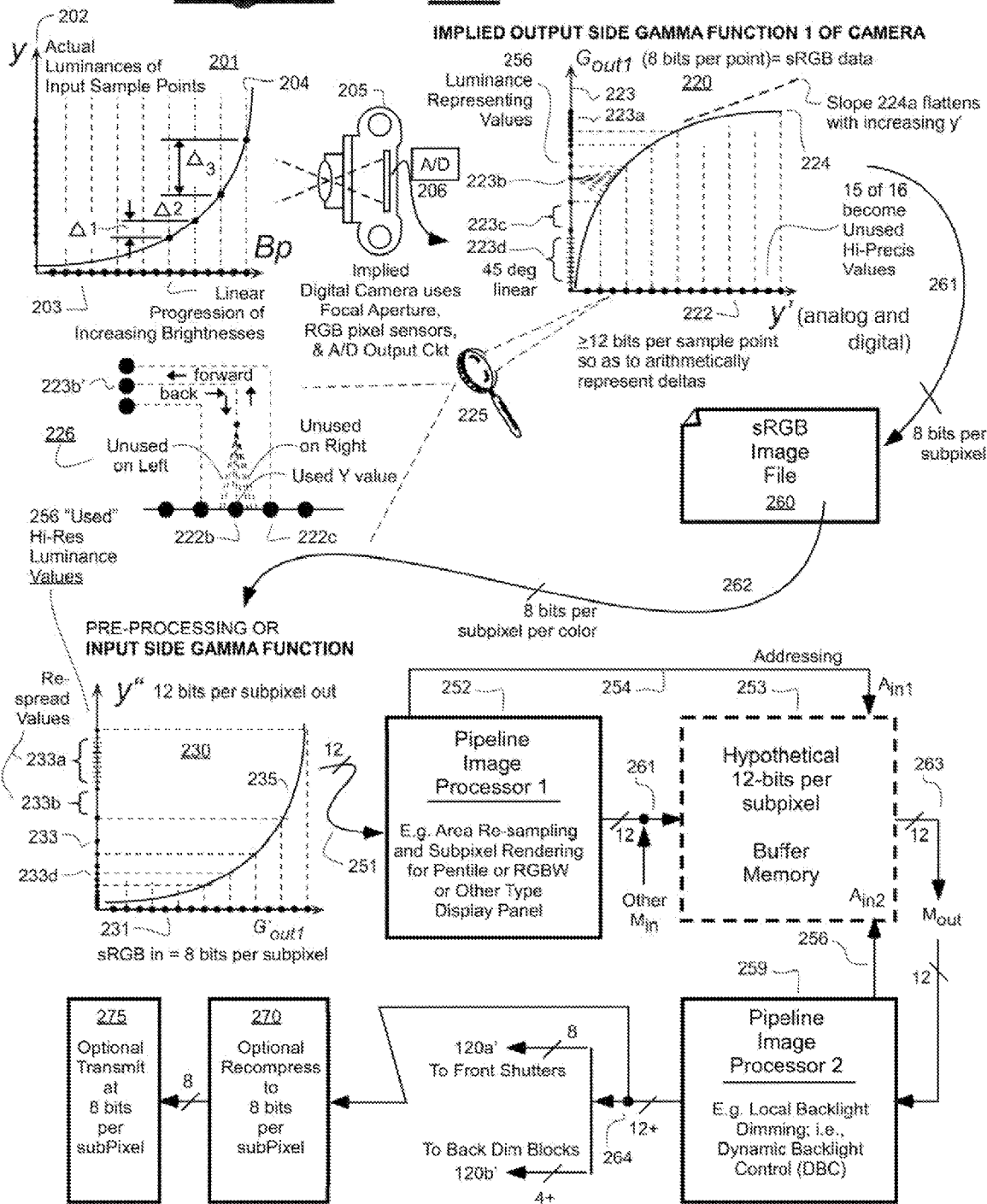
FIG. 2 is a data flow diagram showing how sRGB source data might be re-processed prior to display and how the sRGB source data is implicitly created.

Referring to FIG. 2, some of the concepts covered herein will now be explored to a yet greater level of detail by resort to the schematically presented data flow 200. As mentioned earlier, the human eye-brain complex is adapted to work with scenery that appears "natural" to it. That scenery enters the eye as rays of light having specific luminances (Y values), spatial distributions and temporal distributions; and the eye-brain complex responds to this.

On the other hand, image data within a sRGB image file such as 260 of FIG. 2 is often stored as encoded voltage drive values and not as arithmetically-processable codes that linearly represent luminances (Y values). The encoded voltage drive values are often intended to drive a specific type of legacy display device (e.g., 63 of FIG. 1A) and thus they are not directly usable for display devices of different kinds (e.g., 111 of FIG. 1C). In order to convert for use in an unconventional display device (e.g., a RGBRG Pentile™ display) it is often necessary to nonlinearly convert back into a format that represents arithmetically processable luminance codes (Y values, see conversion function 230 of FIG. 2). The "linearized" code signals are processed as luminance values (see processor 252 of FIG. 2). Then the results are nonlinearly compressed into a new encoding of voltage drive values. Processing and reprocessing of luminance values often calls for high precision binary numbers (e.g., 12-bits/subpixel or greater). As a result, the nonlinear compression circuit (not shown in FIG. 2, see instead the piece-wise linear compressor 320 of FIG. 3) has to respond to a relatively large number of address input bits (generally 12-bits or higher) and this causes the nonlinear compression circuit (if implemented as a conventional LUT) to be undesirably large.

A number of unorthodox concepts are proposed here. One is that the compression following initial linearization of data does not have to be an inverse of the decompression used to produce the linearized data. Another of the unorthodox concepts covered here is the idea of "used" and "unused" high precision number points along a high precision number line.

The concept of "used" and "unused" high precision number points is not an "abstract" idea, but rather one that arises from physical, real world implementations as will be demonstrated by the data flow of FIG. 2. Although image data often appears in a computer display system simply as a data file 260, it is beneficial to step back in time and assume that the image data of sRGB data file 260 arose from the taking of a digital camera snapshot of a natural scene even if the latter did not actually happen.

Accordingly, per the exemplary data flow 200 of FIG. 2, an optical-to-digital image capturing camera 205 was exposed to a natural scene 201 containing color spots of differing chrominances and differing luminance levels (Y's). For sake of illustration it will be assumed that an upper half of the natural scene 201 contains an all-blue sky area (see again 60a of FIG. 1A). Also it will be assumed that, by luck, in one area of scene 210 there is a pure Red colored bar with linearly spaced areas of linearly increasing brightnesses (Bp—not to be confused with luminance). In another area there is a pure Green colored bar with a same configuration and in yet another area a pure Blue colored bar. The differing luminance levels detectable by say, the Red (R) color pixel sensors in the camera when the camera is focused on the pure Red colored bar are shown as number points along vertical axis 202 (Y) of first plot 204. Theoretically, number line 202 has an infinite number of uniquely enumerated, analog number points. However, the designers of the camera 205 have decided to "use" only a very small finite subset of the number points, namely, only 256 of those points (or in an alternate embodiment it could be another integer power of two that is relatively small). Nonlinear curve 204 roughly indicates a mapping between the "used" luminance value points and corresponding, human-perceived brightness values (Bp's) on the digitized horizontal axis 203. The nonlinear mapping curve 204 is structured such that differing and "used" luminance levels at the upper, brighter end of the vertical Y axis are mapped to the X axis with relatively large deltas between them. Contrastingly, differing luminance levels at the lower, darker end of the Y axis 202 are mapped via curve 204 to the X axis so as to have progressively smaller deltas between them. This roughly corresponds to how the human visual system responds to different levels of luminance and perceives them as corresponding levels of brightness. (See again curve 74 of FIG. 1A.)

More specifically, the human visual system generally discerns small deltas between the lower, darker ones of the "used" luminance values fairly well while only being able to discern very large changes or deltas (e.g., greater than $\Delta_3$) at the upper, brightest end of the observed luminance range 202. As shown in FIG. 2, the discernable deltas ($\Delta_3$, $\Delta_2$, $\Delta_1$, etc.) become progressively smaller as one moves from top to bottom along the Y axis 202. If the difference in luminance between two very bright luminance samples is less than, say, a prespecified value $\Delta_3$, then the average human eye will not be able to tell them apart and it makes no sense from an efficiency viewpoint to represent (and thereby "use") those two very bright luminance samples with distinguishable digital signal encodings provided on digitized line 203. Instead the two, perceived as identical luminance values should encode to (quantize into) a same brightness value. More specifically, a single digital signal pattern (e.g., FF in hex) should be sufficient for representing both of these indistinguishable luminance values at the high end. The result of non-distinguishability between close together luminance values on line 202 and the quantization effect that occurs when they are all lumped together and digitally encoded as a same 8-bits wide binary value (e.g., FF in hex) means that many of the high precision number points along analog number line 202 become "unused". The much smaller number of other luminance values, namely a selected 256 of them become the "used" number points. The "used" number points are interspersed among the much larger number of "unused" number points. In one embodiment, each "used" luminance value is assigned a unique and arithmetically representative, 12-bit number (in this example). In theory, with 12 bits available, there could be 2 raised to 12th power of such 12-bit numbers. However, most of them are not "used" because of the quantization process chosen (implicitly) by the designers of hypothetical camera 205. Only 256 of the 2 raised to 12th power number of possibilities (in this example) are "used". The concept of used and unused will be revisited in yet greater detail below.

While nonlinear curve 204 might represent how the average human eye responds, designers of camera 205 do not have to exactly copy curve 204 and to create a perfect inverse of it. They can chose a slightly different curve, for example, curve 224 of transformation graph 220. This next curve 224 provides a mapping as between detected luminance magnitudes (on horizontal axis 222) and corresponding brightness-encoding digital values on vertical axis 223. The luminance_magnitude-to-digital_code mapping curve 224 is often implemented with use of an analog weighting circuit 206 that has an analog-to-digital converter (N/D) at its output end. The N/D output end typically outputs 8-bit encodings for each of the R, G and B color panes where the encoding corresponds to a counterpart, "used" luminance value on the Y' input axis 222 of the mapping curve 224 of that color pane. (The color panes are not limited to R, G and B and in one instance can include at least one of a W (White) pane or C (Cyan) pane if an RGBX configuration is used where X can be at least one of W and C.)

One particular mapping curve 224 that has found favor in the image processing arts is the so-called sRGB curve. It may not be officially recognized by an industry standards body, but nonetheless it (only curve 224; not the whole of graph 220) is used by major image processing companies (e.g., Microsoft and Hewlett Packard adopted it around 1966). The sRGB mapping curve 224 has a linear lower end (223d) that smoothly merges into a nonlinear upper end (223a).

The following is not something which is commonly observed by artisans about the sRGB mapping curve 224 but is observed herein for purposes of better understanding the present disclosure of invention and the concept of used and unused high precision number points. First; so as to distinguish between the many confusing names given to gamma-like functions, the present disclosure will refer to substantially nonlinear mapping curves whose slopes progressively decrease when moving left to right along the parameter input axis (e.g., axis 222) as compression curves. In the case where the sRGB mapping curve is involved, it may be referred to as an "output-side" gamma mapping function.

Secondly; the present disclosure will refer to substantially nonlinear mapping curves (e.g., 235) whose slopes progressively increase when moving left to right along the parameter input axis as decompressing curves. They may also be referred to as "input-side" gamma mapping functions in the case where an sRGB-encoded image file is being re-linearized or decompressed. In other words, the soon-to-be described, mapping curve 235 is an example of an input-side gamma mapping function. (Technically speaking, curve 204 is an output-side gamma function because its input parameter is luminance values 202 and its output is perceived brightness values 203 provided as 8-bits/subpixel signals. However, its orientation in FIG. 2 might misleadingly cause some to consider it as an input curve. The combination of curves 204 and 224 causes brightness values to map roughly linearly to the 8-bit digital encoding values that appear in digital image file 260.)

A thirdly aspect that the present disclosure observes is that the output-side mapping curve 224 can be thought of as an information compressing and quantizing curve from several different points of view. Under a first viewpoint, the Y' horizontal axis 222 could be thought of as an analog number line with an infinite number of analog points (each of infinite precision) distributed along it. Alternatively, under a second viewpoint, the Y' horizontal axis 222 could be thought of as a digitized number line having an associated precision of H-bits per discrete input point, where H can be greater than 8 an in one case it is 12. Among the discrete points of the digitized number line 222, some points are "used" and others are not. Ideally, only one and not two or more "used" H-bit represented discrete points of the digitized number line 222 maps into a corresponding L-bit represented discrete point of vertical output axis 223 (a.k.a. the $G_{out1}$ axis) where in one embodiment each $G_{out1}$ point has a digital precision of 8-bits per output point. More than one "unused" and H-bit represented discrete points of the digitized number line 222 may map into a corresponding L-bit represented discrete point of vertical output axis 223 without creating problems. It is only the "used" points on digitized number line 222 that are of concern. This second way of looking at the Y' horizontal axis 222 will be explored in more detail below.

When given a relatively high (H) but finite number of bits for representing a desired degree of precision, one can readily represent on the high precision digitized number line 222 any integer value of a smaller number of L-bits per discrete output point found on the vertical output axis, $G_{out1}$. Here the case of H=12 and L=8 will be explored. However many variations can be had with similar outcomes (e.g., L=8 while H=10 or H=13 or 16). Assuming H=12, there will be a mere 256 out of the possible 4096 of 12-bit expressed digital number points on axis 222 that will be mapped one-for-one when starting out on vertical axis 223 and tracing back down to the higher precision horizontal axis 222. This mapping is referred to herein as "back-mapping" because the original or "forward-mapping" proceeds from the high precision horizontal input parameter axis 222 to the lower precision, vertical output axis 223. The 256 back-mapped and discrete points (12-bits per point) on the horizontal axis 222 are referred to in this example (H=12 and L=8) as the "used" high precision input points. The remaining 3840 out of 4096 points are referred to in this example as the "unused" high precision points.

Now a more detailed exploration will be had as to what happens in an implied "forward-mapping" process. In essence, the 12-bits per input data point of the scantily "used" 256 number points on the Y' horizontal axis 222 are mapped and compressed through vertical forward (upward) tracing from the Y' horizontal axis 222 to an intercept point on curve 224 and then by tracing substantially to the left from that intercept point to the vertically closest, discrete 8-bit output point on the vertical output axis, $G_{out1}$. In this forward mapping process, "unused" high precision points also get swept into the same, vertically closest, discrete 8-bit output point (due to digital quantization). But that sweeping in of the "unused" high precision points does not matter because, during back-mapping (mapping rightwards from output axis 223 to curve 224 and then straight down to input axis 222) each of the 256 "used" 12-bit number points is reproduced. So no information of the 256 "used" number points is lost in a combined process of forward-mapping from horizontal axis 222, through curve 224 and to vertical axis 223, whereafter the reverse or implied back-mapping process is carried out by starting at that same 8-bit represented point on vertical axis 223 and tracing back to curve 224 and then down to a corresponding 12-bit represented point on horizontal axis 222.

Magnification 225 in FIG. 2 shows the process in more detail so as to explore yet deeper what happens during forward-mapping. The slope of the mapping curve 224 at a given mapping intercept point will be referred to herein as slope 224a. In the illustrated graph 220 which includes the sRGB curve 224, the "used" 12-bit luminance values (Y') are scantily distributed along the horizontal axis 222 amongst a much larger number (3840) of discrete number points which are "unused" but could also be uniquely digitally expressed with 12-bits. Plot 224 has a non-compressing linear segment tilted at an angle of 45° at the lowest brightness subrange 223d. The nonlinear remainder of the sRGB plot 224 is designed to merge smoothly (no kinks) with the linear base segment (of range 223d). It should be noted that the drawing is not to scale and thus the base linear segment (of 223d) appears to have a slope greater than that of 45° although 45 degrees is intended. Because the linear base segment of brightness subrange 223d has a slope of 45°, it provides a one-to-one mapping as between "used" luminance values appearing at the far left end of the horizontal Y' input axis 222 (of graph 220) and correspondingly representative discrete brightness value points near the bottom, darker end 223d of the 8-bits/point digital output axis 223 ($G_{out1}$) of the same graph 220.

Further up along curve 224, the slope 224a progressively decreases towards zero. With each progressive decrease in slope, more and more "unused" H-precision discrete points on the horizontal axis 222 are swept into the one L-precision output point on the vertical output axis 223. Magnification 225 considers the case of 8-bit output point 223b' and "used" 12-bit input point 222b. Twelve-bit input point 222c is a next adjacent, "used" point. However, between the "used" discrete input points, there are a number of "unused" discrete input points. This number of "unused" discrete input points increases as the slope 224a progressively decreases towards zero. The increase of the number of swept-in points corresponds to a compression operation. The lumping together of the one "used" input point 222b and some of its surrounding "unused" points into the single 8-bit output point 223b' corresponds to a digital quantization operation.

Given that each of the forward mapped, and output ones of the 256 "used" discrete number points along the vertical axis 223 only has a unique 8 bit pattern to represent it, if it were desired to digitally represent the true arithmetic luminance values or intensity levels of these 256 8-bits/subpixel encoded numbers, it would be necessary to reconvert to the Y' line, for example by back-mapping them through curve 224 and onto the horizontal axis 222. Such back-mapping does not necessarily have to produce 12-bit results. In some cases, it might be desirable to produce 13-bit results. In other cases, it might be desirable to produce 10-bit results from the back-mapping operation. There is nothing especially magical about the 12-bits/subpixel number. The choice is up to the system designer and it depends on what objectives the designer wants to achieve with the back-mapped digital representations (e.g., 12-bits per back-mapped representation). Upon mapping back to, in this example, the 12-bits per number point domain, it becomes theoretically possible to represent with the 12-bits, more than just the 256 "used" and distinct values. However, it should be recalled from explanation of how the A/D portion of in-camera circuit 206 operates that these additional and in-excess of 256, higher precision number points have no counterpart among the 256 discrete output values output by A/D circuit 206. They are "unused" number points.

In taking a yet closer look at what happens as between the 8-bit discrete points of vertical axis 223 ($G_{out1}$) and the continuum of numbers on input number line 222, it should be observed that during forward mapping (up from the horizontal 222 axis and then leftward to the vertical 223 axis), the sweeping in and lumping-together of used and unused points into one output point (e.g., 223b') is not a symmetrical process at places where mapping curve 224 is nonlinear. More specifically, because the curve slope 224a is greater on the left side of used input point 222b than on its right side, more unused points are swept in on the right side than are on the left side. While each discrete 8-bit long representation (e.g., number point 223b') has a corresponding and symmetrically distributed ½₂₅₆th (approximately) of the vertical axis range around it assigned to it (where here we assume point 223b' is essentially at the center of that quantization zone), the unused H-precision number points that are swept in by forward-mapping are not symmetrically distributed. It is the combination of different slopes 224a to the left and right of used point 222b and the reach of the quantization zone of discrete point 223b' that determines which and how many of the number points on input axis 222 will map to, and be quantized-wise lumped into, discrete point 223b' during forward mapping operation. This concept concerning non-symmetrical sweeping-in and quantized lumping together is schematically illustrated in magnification 225 by virtue of there being more unused points being lumped into the quantization zone of discrete point 223b' from the right side of used point 222b than from its left side. As will become clearer later below, unintended sweeping-in and lumping together of too many points can become a problem. (It is not a problem and is not recognized as a problem in the realm of sRGB curve 224. However, implementation of non-sRGB compression functions (e.g., non-smooth functions) will be described below and it is there that the potential problem arises.)

While all this detailed study regarding asymmetry and scope of sweeping in of the forward-mapping process appears to have no obvious utility at the moment, it will be more clearly seen below (in magnified section 225' of FIG. 3) that a utility is born of it when the compression function is an arbitrary nonsmooth one. Imagine in the case of FIG. 2 and for a moment that mapping plot 224 was modified so that its slope decreases (flattens) significantly and discontinuously at a breakpoint position located exactly over the illustrated 'used' point 222b. In that case, more of the unused number points to the right of 222b would be swept into and quantized-wise lumped within forward-mapped point 223b' on the vertical axis as slope beyond the breakpoint decreases towards zero. If this discontinuous and decreased magnitude of slope to the right is large enough, the next "used" point 222c on number line 222 (of FIG. 2) will inadvertently be swept into forward-mapped point 223b' together with used point 222b. This outcome is undesirable because, in the subsequent back-mapping of discrete point 223b' onto a digitized version of horizontal line 222, the distinction between used points 222b and 222c will have been lost. They will both reappear as a single, back-mapped point (at roughly location 222b but with some quantization error being introduced as to final location due to the digital quantization aspects of the back-mapping). While this undesirable event cannot generally happen when a smooth and well behaved, gamma correction plot like the illustrated sRGB curve 224 is used, the undesirable event may happen if an alternate, not always smooth and not always well behaved plot (see 320 of FIG. 3) is used. One of the goals of the present disclosure is to avoid or reduce the number of "used" points that can become "lost" by way of such quantized-wise lumping together during forward mapping. More specifically, if one is left in a trade-off situation where lossless compression can be provided for only part rather than all of the input number line (e.g., 222), in accordance with the present disclosure, one first identifies regions (e.g., 60a' of FIG. 1B) within the input space that most demand lossless compression and one custom tailors the compression function so as to assure for lossless compression of number points belonging to the identified regions (e.g., 60a' of FIG. 1B) within the input space.

Aside from its asymmetric lumping-together-of-values, an additional detailed aspect of gamma correction curve 224 is worthy of repeated note here. Because its slope 224 is progressively decreasing, curve 224 may be viewed as providing a form of data compression, at least in its nonlinear sections. While 12-bits per point (for example) may be needed for accurately representing the magnitude of delta between "used" number points like 222b and 222c, a smaller number of bits (e.g., 8-bits per point) are sufficient for distinctly representing the 256 "used" points that are forward mapped from horizontal number line 222 onto the vertical axis (digital $G_{out1}$ axis). Hence the output-side gamma function shown by graph 220 is providing a form of data compression by transitioning from a 12-bits per represented point domain (horizontal axis 222) to an 8-bits per represented point domain (vertical axis 223). The number of unused number points on the horizontal axis (222) that get lumped together by forward mapping into a corresponding discrete point on vertical axis 223 progressively gets larger as one moves from the lowest end of vertical axis 223 to its upper end. More specifically, the mapping is one to one in the range of linear segment 223d (tilted at 45° although not so shown). However, by the time one progresses up to the range of upper vertical segment 223a, the forward mapping and compression function is providing a compression ratio of better than 16 to one. The average compression ratio of going from $2^{12}$ possible input values to only $2^8$ distinct output patterns is $2^4:1$; or 16 to one. This average includes the 1:1 non-compressing ratio provided in linear section 223d and the greater than 16:1 compression ratio provided at the far right side of curve 224. As mentioned, the drawing of graph 220 is schematic and not to scale. In practice, curve 224 should not flatten out on its right to a zero slope because that will imply an infinity to one compression ratio in that region. So in practice, the slope of curve 224 (in its utilized domain) is essentially always greater than zero. (However, if the compression allows for a saturated maximum value, then theoretically the curve could include a final curve section having a slope that converges to zero.)

Returning briefly to the operation of camera 205 in FIG. 2, the ND converter 206 of the camera produces an output signal 261 (which signal may have been further modified by camera I/O circuitry) which signal is transmitted to memory device 260. (Note that item 260 of FIG. 1 corresponds to 60 of FIG. 1A.) The camera output signal 261 may be seen as a stream of 8-bits per subpixel signals for each of the respective R, G and B primary color planes. These signals 261 are sequentially written into corresponding parts of the sRGB image file 260 as indicated by the implied data flow line 261 shown in FIG. 2.

The mere fact that an sRGB image file like 260 exists does not mean that a camera such as 205 was actually used to create the image file. Use of the camera is just one of many possible ways that sRGB image file came into being. Also use of a camera 205 or other means for producing sRGB image file 260 need not have happened at a same time or in a same location as where, and when, a respective attempt is made to have a display device (such as CRT 63 of FIG. 1A, of LCD 63' of FIG. 1B or locally back-dimmed LCD panel 110 of FIG. 1C) produce a displayed image from the created image file 260. In one embodiment, file 260 may be transmitted over long distances and stored for a long time before its data is processed by and its image is displayed by display device such as CRT 63 of FIG. 1A, or LCD 63' of FIG. 1B or back-dimmed panel 110 of FIG. 1C. An advantage of having subpixels represented as 8-bits/subpixel entities in file 260 is that transmission bandwidth requirements and storage requirements are reduced as compared to storing data in high precision format (e.g., 12-bits/subpixel).

Although a single, implied output-side gamma function 224 is shown in FIG. 2, it is to be understood that each of the R, G, and B color channels in the sRGB image file 260 may have a slightly different gamma conversion curve (similar to 224) implicitly applied for its respective subpixel values. The combination of linear base segment 223d and the remainder of nonlinear smooth curve 224 shown at 220 is understood to be representative of many potentially different and alternate output side gamma correction curves that could be used implicitly or in actuality for the respective three primary colors (R, G, B) when creating an image file such as 260. Generally, these curves are smooth. They have no sudden change of slope in them.

If and when the image data stored in the sRGB image file 260 is to be used for generating a corresponding image on a conventional, sRGB compliant display unit, the already 8-bit encoded subpixel data in that file 260 can be simply copied into a raster-scanned region 135 of a system frame buffer like 130 of FIG. 1C and then a conventional screen painter (in place of shown unit 120) scans the region 135 and forwards the already 8-bit encoded subpixel drive signals directly to a legacy-CRT compliant display unit (see 62-63 of FIG. 1A) for further conventional processing and ultimate display of the corresponding image.

However, if the data stored in the sRGB image file 260 is to be instead displayed on a nonconventional display screen (e.g. a RGBRG Pentile™ organized version of screen 111), the respective 8-bits per subpixel output data signals 262 obtained from file 260 will generally need to be changed (reprocessed) to accommodate the non-legacy display means. For example, it might be necessary to flow the R, G, B channel streams into respective color channel pre-processing pipeline engines like 82 of FIG. 1B or 132 of FIG. 1C or 252 of FIG. 2 for pre-display processing. The number of pre-processing pipeline engines can be other than just three for the 3 input color channels. For example, if the target display screen 110 uses an RGBW subpixel configuration (where W represents a white light emitting subpixel) then there may have to be at least four pre-processing pipeline engines (like 82 or 132 or 252), one for each of the RGBW output color channels. Before such image data pre-processing can correctly take place however, the 8-bits/subpixel encoded display drive values output from the sRGB file or memory (e.g., memory 60' of FIG. 1B or file 160 of FIG. 1C or file 260 of FIG. 2) will have to be decoded by using an appropriate back-mapping operation so as to produce digital signals that arithmetically represent appropriate luminance magnitudes (Y) in each of the color planes. In other words, the data will need to be decompressed by an input-side gamma function (e.g., 230 in FIG. 2) so as to reconstitute, for example, the 12-bits per subpixel representations on vertical axis 233 of the input-side conversion graph 230. This is routinely done. For example it is done by using a digital-to-digital lookup table (LUT) having 8 address input lines and 12 data output terminals. If three input color channels (e.g., RGB) have to be so decompressed in parallel, then the circuitry will require three instances (not necessarily identical) of the 8-to-12 decompression LUTs. As noted above, each 8-to-12 decompression LUT consumes circuit space; but not nearly as much as would a 12-to-8 re-compression LUT. (Each 12-to-8 re-compression LUT would be about 16 times bigger.)

Somewhere further downstream in the operations of the data pre-processing engines (e.g., engines 82, 132, 252) the pre-processed data signals may have to be re-compressed (e.g., by ReComp LUT 83 in the case of FIG. 1B). However, as mentioned, use of 12-to-8 re-compression LUT's is problematic. Each 12-to-8 re-compression LUT tends to be much bigger in terms of consumed die space than a corresponding 8-to-12 decompression LUT. And because the number of output color channels for an RGBW or other greater than 3, multi-color display (e.g., RGBCW, where C is for cyan) is greater than three, die space consumption becomes even a greater problem when multi-color displays such as RGBW or the like are used.

In the example of FIG. 2, a desire for having a 12-to-8 re-compression functionality actually comes soon after the pre-processing engines (only one shown at 252) perform their data pre-processing operations. First, though, the case will be considered wherein 12-to-8 re-compression does not have to take place in FIG. 2. Pipeline processor(s) 252 of FIG. 2 correspond(s) to pre-processor 132 of FIG. 1C. Pipeline post-processor(s) 259 of FIG. 2 correspond to an internal parts inside post-processor(s) 139 of FIG. 1C. Rather than showing the 8-bits/word frame buffer 130 interposed in FIG. 2 between processors 252 and 259, the drawing proposes as a temporary solution (which solution will soon be rejected), the placing of a 12-bits per subpixel buffer memory 253 between the pipeline processors. By way of explanation, one reason why a buffer memory such as 253 might be necessary in some embodiments is because the post-processor 259 needs to operate on a composite collection of image objects when dynamically controlling operations such as localized backlight dimming on a sub-area by sub-area basis and buffer memory 253 is where a high precision version (e.g., 12-bit/subpixel) of the composite image is formed. While not shown, it is to be understood that data processors other than 252, and even an external CPU like 150 (e.g., operating via an interface like 140 in FIG. 1C) might be simultaneously writing additional image data into buffer memory 253 so as to thereby contribute to formation of the composite image. So it cannot be assumed that processor 252 will have exclusive write access to buffer memory 253.

Part of the problem with switching to a high precision image buffer like 253 (one that stores 12-bits per subpixel) is that modern display panels like 110 of FIG. 1C tend to have very high, number of pixels resolution (large numbers of independently controlled pixels or subpixels per row and large number of rows per frame). Thus switching to a 12-bits per subpixel frame buffer 253 would generally call for larger amounts of system frame buffer memory for storing data representing the on-screen subpixels. However, the bigger problem is that the number, 12 is not a fixed one. System designers may change their minds one day and decide that one or more of the pre-processing engines (252) and/or post-processing engines (259) needs to operate with a precision of say, 13-bits/subpixel or 11-bits/subpixel. In the first case, the hypothesized, 12-bits per subpixel frame buffer 253 becomes too small and thus unusable. In the second case (11-bits/subpixel) some of the storage capacity is wasted. Yet another problem with switching to storage in the format of 12-bits/subpixel (buffer 253) is that preexisting designs for system frame buffers like 130 are already available and they have been set to have a efficiently organized large number of high density and quickly accessible memory words at the 8-bits per subpixel format. It would be wasteful to not take advantage of such already-designed and efficiently packed memory designs for storing image related data at 8-bits per subpixel.

Assuming nonetheless that the temporarily-proposed solution of large buffer 253 is in place, it can be seen in FIG. 2 that output data 251 produced by the input-side gamma function module 230 is a de-compressed version of signal 261 with luminance of each subpixel arithmetically expressed as a 12-bit magnitude. This linearized data signal 251 enters into pre-processing module 252 for transformation by way of one or more image data transformation operations. For example, the first image data processing engine 252 in the pipeline may pick up the linearized output data 251 from one or more input color channels (RGB) and perform one or more arithmetic processes on this linearized flow of input data 251. The arithmetic processes may include so-called area-resampling wherein fractional portions of same-colored adjacent subpixel luminance values are added together to create area-resampled values corresponding to the subpixel organization (e.g., Pentile™, or RGBW or other) in the target display screen 111. At a same time or further downstream in the pipelined processing of the linearized input data 251, image-sharpening filter operations may be applied to the subpixel data and/or color rebalancing filter operations may be applied to the subpixel data in order to improve image quality.

The arithmetically or otherwise digitally reprocessed data signals produced by the first image processor 252 are output along a 12-bits wide output bus 261 into the hypothetical 12-bits per subpixel memory buffer 253 for temporary storage therein. In other words, the transformed and high precision data items output by the first image processor 252 are hypothetically stored as 12-bits per subpixel data objects in hypothetical memory buffer 253. (As will be seen shortly, in accordance with the present disclosure this hypothetical memory buffer 253 will instead be replaced by a real re-compression module followed by an 8-bit frame buffer and then followed by a decompression module such as the 320-130'-330 series shown in FIG. 3).

Pipeline processed image data output from the second processor 255 and along line 264 may next be supplied (optionally) to an output-side gamma conversion function or to another data re-compression module 270 and thereafter the compressed data may be transmitted 275 as such to a corresponding display unit or to another data signal receiving device. Alternatively, the 12-bits/subpixel (or higher precision) data output from image processing engine 259 may be applied to forward shutters and backlight dimming blocks of display device 110 (FIG. 1C) and/or used to control temporal/spatial dithering (see again 67' of FIG. 1B).

With respect to modules 230, 252 and 259 of FIG. 2, it is to be noted that different input-side and output-side gamma conversion functions (220, 230) and different in between processings (252, 259) may be applied to each of the output color channels (could be RGBW) that drive the display device. The output color channels need not be of the same number or of the same colors as the input color channels. For example, the output color channels may be of the RGBCW type (where C is cyan and W is white) rather than simple RGB.

Figure 3:
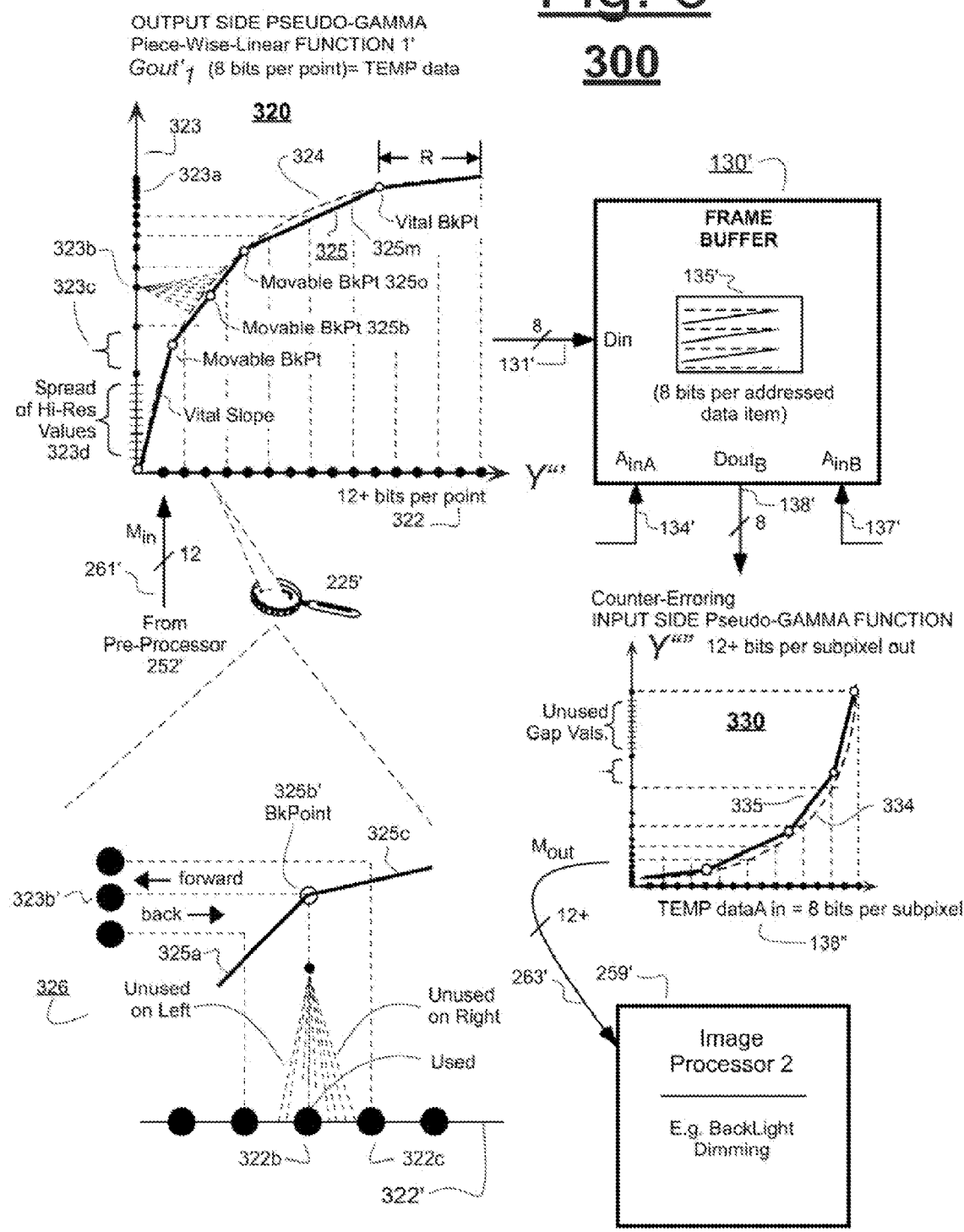
FIG. 3 is a further data flow diagram, combinable with FIG. 2, and showing how being re-processed image data may be temporarily stored in a system frame buffer of bit width smaller than that of the being re-processed image data.

Referring to FIG. 3, shown there is a substitute memory system, having modules 320, 130' and 330, that may be substituted for and used in place of the hypothetical buffer memory 253 of FIG. 2. As more specifically shown in FIG. 3, the substitute memory system includes an output-side pseudo-gamma function conversion module 320 that implements a substantially piece-wise linear (PWL) first data transform (defined by PWL function 325) to thereby provide non-casual data compression (from 12-bits per subpixel to 8-bits per subpixel in this example). The substitute memory system also includes the system frame buffer 130' (which stores data at 8-bits per subpixel) and an input-side pseudo-gamma conversion function module 330 that may also rely on a piece-wise linear (PWL) data transform function 335 for converting from an 8-bits per data item domain back to the 12-bits per subpixel, arithmetic representation domain. (Alternatively, a data transform LUT may be used in module 330 because a decompression LUT with only 8 input address bits is roughly 16 times smaller and 16 times less complicated than a compression LUT with 12 address input bits.) For sake of better understanding of how this substitute memory unit 320-130'-330 is incorporated into the system of FIGS. 1C and 2, a downstream portion of the system is shown in FIG. 3. This downstream portion 259' is shown to include the second image processor 259', where the latter is shown to be receiving the 12-bits per subpixel output signal 263' produced by the input-side pseudo-gamma function conversion module 330.

As further seen in FIG. 3, the first piecewise linear data converting module 320 roughly mimics the function of an output side gamma conversion function except that the pseudo gamma function 325 consists substantially of piece-wise linear mapping segments attached one to the next. One of the linear mapping segments is the line segment identified by reference number 325m. Each linear segment (e.g. 325m) may be defined as having a starting breakpoint (BkPt) 325o located in the coordinate space of graph 320, a constant slope m that cause the segment to extend rightward from that break point to, optionally, a next breakpoint, and a limited extension distance or range of applicability (R) over which the piece wise linear segment 325m extends beyond its initiating break point 325o.

Referring to magnification 225' and it corresponding magnified view 326, it is to be recalled that the compression ratio of a given mapping curve section is related to its slopes. The compression sweep of a given discrete point (e.g., 323b') on the vertical axis is also related to its associated quantization zone. More specifically, in the illustrated example of 326, each 8-bits long discrete output point (e.g., 323b' on the vertical axis) is assigned about 1/256th of the utilized range of the vertical axis as its respective quantization zone. The combination of slopes for back-mapping through PWL function 325 and in that zone of influence determines which and how many number points on the horizontal axis (322') will be quantized-wise lumped into the discrete point (e.g., 323b') during a hypothetical forward mapping. And that determines whether any "used" high precision number points (e.g., 322b, 322c) will be lost or not lost during forward-mapping. As explained above, it is desirable to avoid losing high precision number points (e.g., 322b, 322c) during the forward-mapping process (even if forward-mapping is not actually performed), especially for domains (e.g., 60a' of FIG. 1B) where lossy compression and/or subsequent lossy decompression cannot be tolerated. As explained above, the closer to zero that the slope of the forward-mapping function gets, the greater is the quantity of unused and/or used number points that get swept-in and quantized-wise lumped together by the forward-mapping function into a corresponding discrete gathering point (e.g., 323b') of the vertical axis 323.

Yet more specifically, if at a given breakpoint 325b' (shown in magnification 326) of a PWL compression function, the right side linear segment (e.g. 325c) has a slope which is substantially smaller than the slope of the left side linear segment (e.g. 325a), then the compression ratio of the right side linear segment (e.g. 325c) will be substantially greater and it will be sweeping in a greater quantity of unused or used number points into an associated and discrete, quantizing gathering point (e.g., 323b') during forward mapping than will the left side linear segment (e.g. 325a). The extent of sweep (or quantized-wise lumping together) of a given linear mapping segment (e.g., 325c) can be such that it sweeps in two or more "used" number points like 322b and 322c into a same discrete gathering point like 323b'. If that occurs, one or more of the "used" number points (e.g., 322b and 322c) will be lost during the back-mapping operation (irrespective of what decompression algorithm; i.e. 330, is used). In other words, it will be a lossy compression process. This happens because the distinction between the "used" number points (e.g., 322b and 322c) is destroyed when both are quantized into a single digital discrete gathering point (e.g., 323b'). It is generally undesirable to have such a loss of "used" number points because that can lead to display of corrupted images in a display system that obtains its image data signals by use of compression module 320. However, if loss is unavoidable, then it is undesirable to have the loss occur in portions of the input domain where such quantization-induced loss will be most strikingly perceived (e.g., in zone 60a' of FIG. 1B).

In accordance with one aspect of the present disclosure, the utilized and piece-wise substantially linear (PWSL) compression plot 325 is provided with adjustable breakpoints (at least during the design of the compression module 320) so that the position of a given breakpoint (e.g., 325b') in the coordinate space of graph 320 and the slopes (m1, m2) of a corresponding one or more linear mapping segments (e.g. 325a, 325c) that join at that breakpoint can be adjusted (tuned) so as to try to avoid undesirable quantized-wise lumping together of "used" number points during forward mapping or so as to at least reduce such undesirable lumping together to a prespecified acceptable amount and to avoid quantization-induced loss in identified zones (e.g., in zone 60a' of FIG. 1B) where such quantization-induced loss cannot be tolerated. Alternatively, if the undesirable lumping together of "used" number points must happen, then in accordance with the disclosure such lumping together is selectively pushed into luminance domains (e.g., brightest region 323a) were such quantization-induced loss can be best tolerated due to perception characteristics of the human visual system. (More specifically, in FIG. 5A it will be disclosed how the locations of such undesirable lumping togethers and resulting quantization-induced losses can be ascertained.)

Figure 4:
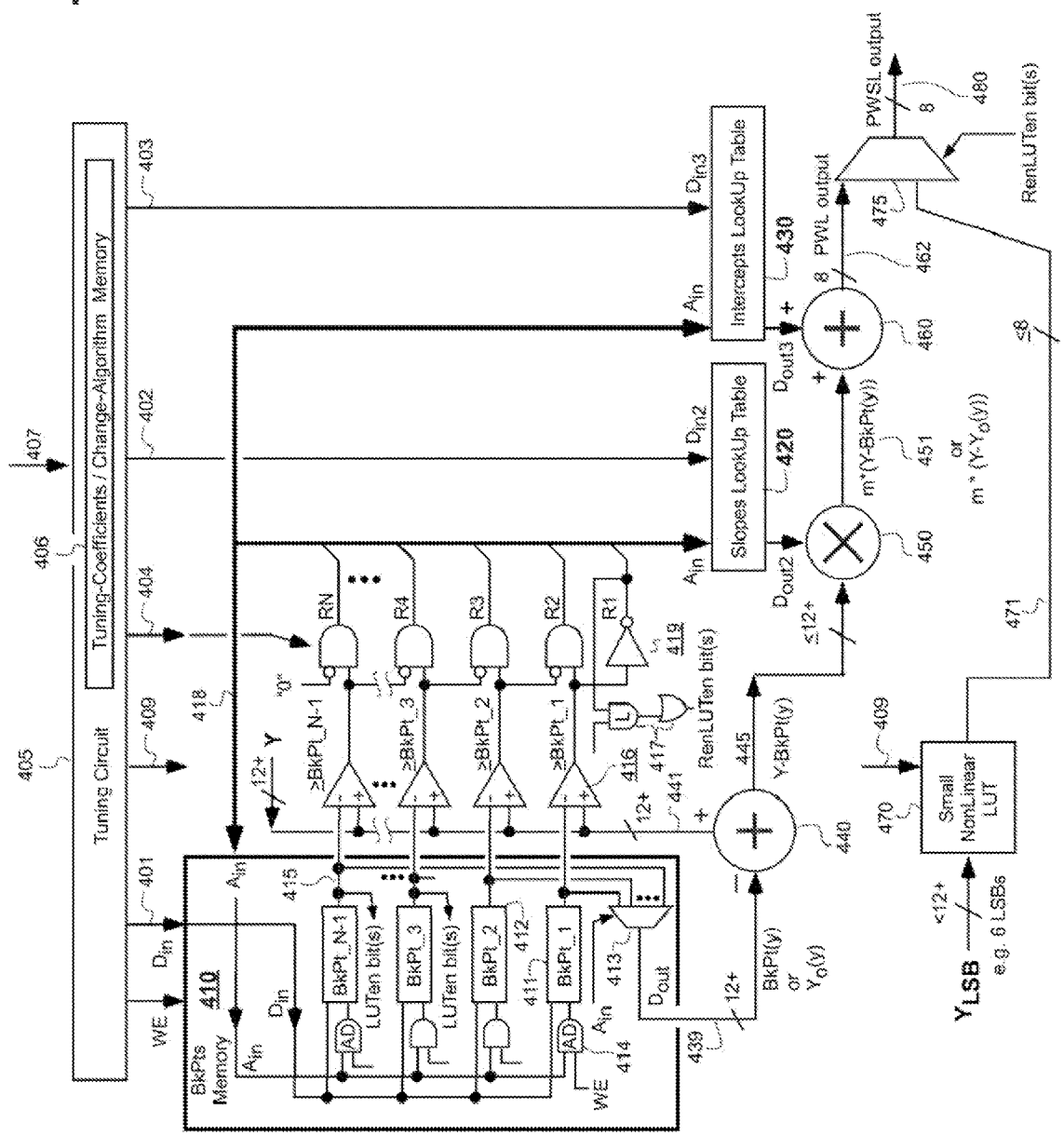
FIG. 4 is a schematic diagram showing one possible organization for a piece-wise substantially linear (PWSL) data transformation mapper that operates in accordance with the concepts disclosed herein.

As used herein, the term, "piece-wise substantially linear (PWSL)" is to be understood to include "piece-wise all linear (PWL)" transformations wherein all segments of the mapping plot (e.g., 325) are linear. However, the term PWSL is also to be understood to allow for inclusion of a minor amount of nonlinear mapping in select regions of the transformation space if such minor amount of nonlinear mapping is needed in a particular subdomain (e.g., 323c) of the overall mapping plot. Stated otherwise, it is within the contemplation of the disclosure to replace one or a few of the linear mapping segments (e.g., 325a, 325b, 325m) shown in graph 320 with essentially nonlinear mapping segments. A method for doing so will be explained in FIG. 4 when item 470 is described. An objective here is to provide PWSL mapping circuits where the size (e.g., die area) and/or complexity of the provide PWSL mapping circuits are substantially less than those of a mostly nonlinear mapping plot (e.g., 324) that the PWSL mapping circuit (e.g., 320) is trying to substitute for (even without trying to mimic the replaced, smooth and nonlinear compression function). It will be seen below, when FIG. 4 is discussed that a relatively small LUT (470) can be selectively activated for use in a small section of the high precision number line so as to provide nonlinear mapping for that section if necessary while the rest of the high precision number line (e.g., 322) is mapped into a low precision digitized number line (e.g., 323) by way of linear mapping segments.

The PWSL compression plot 325 (FIG. 3) need not try to mimic a corresponding gamma function 224 (FIG. 2). However, in some cases there may be good reason for wanting to do so, namely, to closely approximate a specific output-side gamma function like 224 of FIG. 2.

However, the advantage of the PWSL compression plot 325 does not come in replacing the A/D compression function 224 of camera circuit 206. Instead, it comes in replacing 253 hypothetical buffer memory 253 of FIG. 2 with a memory like 130' of FIG. 3, where that memory 130' is sandwiched between a PWSL compression function module 320 on its input side and a countering decompression function module 330 on its output side. Incidentally, the countering decompression function module 330 does not have to be a PWSL decompression module. It can be a small-sized LUT instead.

The reason that it is important to have an appropriately 'tuned' PWSL compression module 320 on the input side of the fixed bits per subpixel memory 130' of FIG. 3 is multifold. First and foremost, the PWSL compression module 320 can be made substantially smaller in die-area consuming size than can a comparable LUT (e.g., 83 of FIG. 1B).

Secondly, with appropriate tuning of its breakpoint locations and linear slopes provided in between, the PWSL compression module 320 can be configured to avoid the quantized-wise lumping together of two or more "used" number points (e.g., 322b and 322c) into a single gathering point 323b' during forward-mapping.

Thirdly, because a relatively small number of breakpoint registers are needed (see briefly 411 of FIG. 4), these can be each provided with a relatively large number of bits for the one covered breakpoint (e.g., for decompressing a 16 bits per subpixel or even a 20 bits per subpixel input stream) and the PWSL compression module 320 can therefore be structured to handle any of a wide variety of decompression tasks without significant degradation of efficiency per consumed unit of IC die space. In other words, if the circuit designer decides to switch from 12 bits per subpixel arithmetic representation to 13 or 14 bits per subpixel arithmetic representation, the PWSL compression module 320 (with 16-bit BrkPt registers) can handle it. On the other hand, if the circuit designer decides to switch from 12 bits per subpixel arithmetic representation down to 11 or 10 bits per subpixel arithmetic representation, the PWSL compression module 320 (e.g., with 16-bit BrkPt registers) does not impose a large penalty on consumed IC die space due to a fractional part of the PWSL compression module 320 not being then needed.

Fourthly, the breakpoint specifications of the PWSL compression module 320 can be made fairly compact and they can be transmitted to a remote location where decompression is to occur before decompression at the remote location commences. Hence the PWSL compression module 320 can be used for adaptively compressing data over a transmission channel of limited bandwidth without consuming large die space.

Still referring to the PWSL function 325 of digital module 320 of FIG. 3, in the case of a known A/D conversion process such as that of sRGB (which conversion type may be indicated by a header in image file 260) it may be advantageous to fix certain breakpoints so as to exactly match certain attributes of the known A/D conversion process. More specifically, for sRGB it is known that the darkest leg 323d of the sRGB down-mapping function (224) should have a slope of 45 degrees (one-to-one mapping). Accordingly, the design of the mimicking PWSL compression module, if it is to mimic sRGB or an alike conversion function (although mimicry is not necessary or always desirable) may include a specification that a vital slope (e.g., 45 degrees) should be maintained within a prespecified range (e.g., 323d of FIG. 3). Also for sRGB it is known that the white point is to be precisely positioned at specific luminance values for R, G and B. Accordingly, the design of a mimicking PWSL compression module may include a specification that a vital fixed point be maintained by a corresponding breakpoint (Vital BkPt). The design specification may allow for movement of locations of others of the breakpoints and for change in the number of breakpoints used in the PWSL compression module 320 well as tuning of the slopes of the linear segments provided between the breakpoints.

In FIG. 3, the resulting 8-bits per subpixel output data signals 131' generated by the PWSL compression module 320 are stored into raster-scanned area 135' of the system frame buffer 130' at locations specified by address signals input on the $A_{inA}$ port 134'. It is understood that other devices (e.g., 150/140) besides pre-processor 252 may take over bus mastery of the data input port (131') of the frame buffer for writing their data into the frame buffer at appropriate time points. Thus a composite image may be formed in the frame buffer which is a result of write activities beyond those of just the pre-processor 252. The screen painting timing controller 120 determines the timing of and address values of read address signals applied to the $A_{inA}$ port 137' of the frame buffer 130' of FIG. 3. Output signals 138' may have post-processing applied to them, and if that is the case such output signals 138' may be directed into a decompression module such as the PWSL module 330 for re-expansion into the 12-bits per subpixel (or other) domain prior to being processed by the post engine 259'. (Recall however that decompression from 8-bits/subpixel to 12-bits or other number of bits per subpixel does not call for LUT as big as a 12-to-8 compressor. Thus 330 could almost just as easily be an 8-to-12 conversion LUT in place of the illustrated 8-to-12 PWSL decompressor 330.)

In one embodiment, the compressed 8-bits per subpixel data 138' output by the $D_{outB}$ port is transmitted via a serial data or parallel data transmission medium to a spaced apart (e.g., remote) receiver. The advantage of transmitting compressed data is of course, that less transmission bandwidth is needed for compressed signals. The advantage of using a PWSL compression module like 320 is that the latter module 320 can be structured to have smaller footprint and/or consume less power than a full-sized 12-to-8 compressor LUT. Moreover, as will be seen, a programmably variable version of the PWSL compression module 320 can have its adaptively changed breakpoint specifications sent to the remote receiver, whereat a corresponding, inverse and programmably variable version of a PWSL decompression module 330 is provided. Accordingly, a combination of data compression and data transmission system that uses a PWSL compression module like 320 and a PWSL decompression module like 330 can be manufactured in smaller size and/or less expensively and/or with lower power consumption and lower consumption of transmission bandwidth.

Assuming that output data signals 138' of FIG. 3 are to be post-processed by downstream engine 259', that data is next read out from data output port $D_{outB}$ of the frame buffer 130' as 8-bits per subpixel data and applied to a decompressor module 330 where, optionally, the latter is also use piece-wise substantially linear (PWSL) decompression; for example according to PWL mapping plot 335 to decompress the data. However, since circuit size tends to be smaller anyway when performing a decompression and going from 8-bits per subpixel to say, 12-bits per subpixel, a decompression LUT may instead be used as mentioned above. As seen in FIG. 3, for one embodiment, the PWL plot 335 implements a conversion function 335 that is inverse to the conversion function 325 provided by PWSL module 320. The linear segments of PWL plot 335 may be tuned to counter-correct for errors introduced by the PWL compression plot 325 of module 320. (One method for so doing is provided by FIG. 6A-6B.) The resulting 12-bits per subpixel output data 263' of module 330 is then transferred to the second image processor engine 259' for further use.

Although FIG. 3 shows the PWL compression function (320) and PWL decompression function (330) as being applied at the data input and data output ports (132', 131') of a frame buffer 130' that stores image data originated from an sRGB file, it is within the contemplation of the present disclosure to similarly apply PWSL compression and PWSL decompression approaches for temporarily transmitting 8-bit wide (or narrower) data over an 8-bit wide (or narrower) data transmission channel. The compression and decompression plots may be different however and may dependent on how the high precision "used" number values are distributed along the high precision number line of a given application. The transmission channel which transmits the compressed data can, thanks to the compression, use a fewer number of parallel transmission lines and/or a fewer number of or shorter ones of multiplexed time slots depending on how the compressed data is multiplexed (spatially and/or temporally) when being transmitted over the transmission channel. Additionally, Although FIG. 2 assumes 8-bits per subpixel and sRGB formatted image data being stored in file 260 and 12-bits per subpixel data being processed by the image data processing engines (252, 259) of the illustrated pipeline, it is within the contemplation of the present disclosure to use data encoding formats other than sRGB and to use other values of bits per subpixel for the lower precision (e.g., ≠8 bpsp) and higher precision (e.g., ≠12 bpsp) value representing data signals (e.g., 262, 251 respectively). Moreover, even though high precision has been illustrated here as coming in the form of 12-bits per subpixel for each of the RGB color channels, it is within the contemplation of the disclosure to use other numbers of bits per subpixel for defining (representing in an encoded way) high precision values. For example, in one embodiment that utilizes RGBW output channels, the linearized high precision data representing the white channel output may be only 11-bits per subpixel rather than 12. In other embodiments, one or more of the colored output channels (e.g., Green) may have its high precision image data represented in linearized form as 14-bits per subpixel rather than 12.

Referring now to FIG. 4, shown is a substantially piecewise linear (PWSL) mapping module 400 that may be provided in accordance with the present disclosure. In one embodiment, module 400 is programmably re-tunable and in another it is tuned essentially just once, for example during design and then it is substantially fixedly programmed (e.g., by storing coefficients in a Flash EPROM that is only rarely re-programmed). The programmably re-tunable version is shown in FIG. 4 and as such it includes a tuning circuit 405, where the latter is not needed for the substantially fixedly programmed version but may nonetheless be simulated during design of the module 400. The module includes a breakpoints storing memory module 410, a slopes lookup table (slopes LUT) 420 and an intercepts lookup table (intercepts LUT) 430.

Although one particular range identifying scheme is shown in FIG. 4 for identifying which of number ranges R1, R2, ..., RN is the proper one for use with a high precision input sample signal, Y; it is to be understood that the illustrated scheme is for purposes of conveying the concept of automatically identifying the appropriate number range (R1, R2, ..., RN). Other, more efficient schemes such as binary tree decoding could be used instead. The specific range decoding scheme used by the designer may depend on a number design criteria including on how quickly the decoder circuit has to generate the range identifying signal (e.g., the Ain signal 418 that is applied to LUT's 420 and 430).

Within the illustrated breakpoints-storing memory module 410 there are provided a plurality of breakpoint storing registers or memory locations 411, 412, etc. There is also provide a breakpoint selecting multiplexer 413, and breakpoint overwrite circuitry 414 (address decoding plus write-enable). In one embodiment, each of the breakpoint storing registers or memory locations 411, 412, etc. is at least 12 bits long. In the same or an alternate embodiment, each of the breakpoint storing registers or memory locations 411, 412, etc. is at least 16, 18, 20 or 24 bits long.

During design or re-tuning of the module 400, different breakpoint values are stored in the individually addressable registers or memory locations 411, 412, etc. by use for example of the breakpoint overwrite circuitry 414. The overwrite circuitry 414 includes a plurality of address decoders (AD) which uniquely output respective logic highs ("1") when a supplied address input signal $A_{in}$ (418) matches a correspondingly unique register identification during a register over-write operation (WE is also at "1" then). The address input signal $A_{in}$ (418) is normally produced by a range identifying circuitry (419) having tristate outputs. However, the $A_{in}$ bus (418) can be mastered by a register identifying source circuit (not explicitly shown) during the register over-write operation (when WE is at logic "1"). In that mode, the $A_{in}$ signal (418) identifies the breakpoint register that is to be written into (provided write enable WE to 414 is also active) and the data input port $D_{in}$ supplies the new breakpoint defining signal 401 for storage into the addressed register 411, 412, etc. when the corresponding address decode circuitry, AD indicates that it is this uniquely identified register (or memory location) which is the one to be written (or overwritten) into during the corresponding phase of the register over-write operation. During such setting or resetting of the breakpoint coordinates, tuning circuit 405 has control over the range identifying circuitry (419) and thus dictates what $A_{in}$ signal (418) will be output. For sake of simplicity, not all the circuitry is shown.

After appropriate breakpoint values are written into addressable registers or memory locations 411, 412, etc. during the register over-write operation and corresponding slope values and intercept values are further written into addressable locations of LUT's 420 and 430, the illustrated PWSL module 400 is substantially ready to enter into is in-field decompression phase of operation. (Programming and use of small LUT 470 is optional and will be described later.)

During in-field decompression operations, comparators 416 determine the appropriate range (R1, R2, ..., RN) as shall be detailed shortly. In one embodiment, the new breakpoint defining signal 401 that is written into each addressed one of registers 411, 412, etc. includes more than just the bits representing the value of a corresponding breakpoint (e.g., a 12-bits or more or less per breakpoint). It also includes one or more LUT substitution enabling bits (LUTen bit or bits). This allows for one or more small nonlinear mapping LUTs (e.g., only one shown at 470) to be substituted in, in place of a piece-wise linear mapping segment as shall be detailed later. Aside from full substitution of small LUT 470 in place of a linear segment it is within the contemplation of the disclosure to have LUT 470 substitute in for only lesser significant ones of the compressor output bits (the output LSBs) or for the selectively activated small LUT (470) to provide a corrective value that is added on to piece-wise linear output signal 462 as shall be detailed below.

Output signals (e.g., 415) of the respective breakpoint registers 411, 412, etc. are coupled respectively to corresponding value comparators 416, etc. Each value comparator 416, etc. determines whether a current, high precision input signal 441 (the Y signal, which in one embodiment is 12 bits wide or wider) is equal to or greater than the breakpoint value stored in the corresponding breakpoint register 411, 412, etc. Additional logic circuitry 419 then determines which of plural value ranges, R1, R2, ... RN is the one in which the current high precision input signal 441 (Y) resides. The identified current range, R1, R2, ... RN is specified by the $A_{in}$ signal 418 as previously mentioned. Logic circuitry 419 outputs the $A_{in}$ signal onto tristate bus 418. Multiplexer 413 (inside unit 410) has an input selection determining port driven by the $A_{in}$ signal 418 and thus multiplexer 413 outputs the starting breakpoint value for the currently identified range (R1 or R2 or ...) over the Dout line 439 for processing by an offset subtracting circuit 440.

Once again, it is to be understood when considering the illustrated circuitry of FIG. 4 and as explained above, that this design is for purpose of explaining the principles of operation. More efficient circuitry such as binary tree decoding circuitry could, of course, be devised by those skilled in the digital circuitry arts for producing equivalent results once the principles described herein are understood. More specifically, the value comparators 416, etc. need not be organized to carry out independently parallel and full comparisons but rather they could be organized for integrated binary tree driven determination of the currently active range among R1-RN. For example, a first subtractor (not shown) performs the operation Y minus BkPt_m where BkPt_m is a median breakpoint stored in one of registers 411, 412, etc. designated as the median register for all of ranges R1-RN. If the result is positive or zero, it is determined that Y is in the upper set of ranges, Rm-Rn whereas if the result is negative it is determined that Y is in the lower ranges, R1 to R(m−1). Then a next circuit determines the value of Y minus a median breakpoint in the upper or lower set of ranges and so on. Since the value of Y minus the breakpoint of the current range is desired in one embodiment as the output 445 of subtractor 440, the additional subtractor 440 may be omitted in such a more efficient design where Y minus breakpoint is being determined anyway in the range identifying logic. So to reiterate, the purpose of FIG. 4 is to illustrate the principles of operation. Those skilled in the art will then be able devise more efficient circuitry once the desired one of possible variations is picked. (For example breakpoint registers other than the first median one could store delta values, $(BkPt_i-BkPt_j)$ so as to reduce number of bits stored and speed the determination of which range the current Y input signal belongs to.)

As already mentioned, aside from the breakpoints storing memory module 410 and the range identifying logic circuitry 419, module 400 comprises the slopes lookup table (slopes LUT) 420 and the intercepts lookup table (intercepts LUT) 430. In the reprogrammable version of module 400, the tuning circuit 405 is operatively connected via respective data write and control lines 401, 402 and 403 to each of the breakpoints memory module 410, the slopes LUT 420 and the intercepts LUT 430 for respectively modifying, when desired, the stored data points or values held in memory locations of each of these memory devices (410, 420, 430). Tuning circuit 405 further includes circuitry 404 for taking bus mastery control over the $A_{in}$ address bus 418 when tuning the memory devices: 410, 420 and 430 so that the tuning circuit 405 can selectively address and write into desired memory locations or registers. In one embodiment, where optional LUT 470 is included, the tuning circuit 405 further includes circuitry 409 for programming LUT 470. In one embodiment, tuning circuit 405 includes a microcontroller or other instructable data processing machine (not shown) and a nonvolatile memory 406 for storing boot-up coefficients and for storing a PWSL switching algorithm that is executable by its instructable data processing machine (not shown) for changing the PWSL mapping curve as external conditions warrant. In other words, system 400 may operate according to a selected one of many different PWSL functions where the selected PWSL transformation function is automatically selected in response to change of external conditions. Signals representing such external conditions and/or representing the power-up boot or other coefficients and/or the PWSL switching algorithm may be input into the tuning module 405 by way of interface line 407. The input coefficients and instructing signals (e.g., computer program) may be provided from a computer readable medium such as a hard disk or a CDROM or a flash memory. In one embodiment of the tunable version of mapping module 400, the tuning module 405 automatically switches from using one set of coefficients to another set (which coefficients are retrieved from memory 406) in response to changed external conditions such as in response to a change of the display panel being used and/or to change of the image processing algorithms being used in the image data processing engines 252 and/or 259 of FIG. 2.

During the mapping operations (e.g., data compression operations) of the PWSL mapping module 400, the Ain bus 418 which specifies the current operating range R1-RN of input signal Y also drives the address input ports of the slopes LUT 420 and the intercepts LUT 430. Depending on which range is true, the breakpoints memory 410 will output from its Dout port a range initiating breakpoint value onto output line 439. (In an alternate embodiment, the Dout port produces a Yo translation value that is a function of address signal 418 and is indirectly a function of the 12 or more bits wide input signal Y supplied on line 441.) The 12+ bits wide breakpoint value 439 is then combined in subtractor 440 (or elsewhere) with the supplied 12+ bits wide input signal Y (of line 441). The same Y input value 441, by the way, is also applied to the positive input terminals of the 12+ bit wide value comparators 416 or their binary-tree equivalents as previously described. As illustrated in FIG. 4, the comparators 416 produce result signals indicating if the current Y signal (441) represents a value that is greater than or equal to breakpoint BkPt_1, or breakpoint BkPt_2, and so on, where BkPt_1, BkPt_2, etc. are the breakpoint values stored in and output by memory 410. In an alternate embodiment, comparators 416 may be made capable of comparing data words of higher precision than 12-bits per word, for example at least 14-bits or more per compared word. The latter system is able to accommodate different design choices such as choosing to use 14-bits per subpixel rather than 12 on horizontal axis 222 of FIG. 2 or choosing to instead use, say, 11-bits per subpixel as the size of the high precision and to-be-compressed digital signals.

Due to the arithmetic operation electronically performed by subtractor 440, its output signal 445 represents the input signal value, Y minus the output breakpoint value 439. This output signal 445 can have a bit width (number of bits) that is less than the 12+ bits width of signal 439 because the picked breakpoint value 439 for the given range R1-RN is generally close in value to the input signal value Y. Accordingly in a follow-up multiplier 450, less than all of 12 original bits (or larger number of original bits) have to be multiplied against the output slope (m) produced by LUT 420 to thereby produce a signal 451 representing m*(Y−BkPt(y)). In the latter expression, Y and y both represent the currently input high precision signal 441. The lower case y is shown as such so that it doesn't over dominate the more important BkPt( ) function. Since fewer bits are being input to it, the multiplier 450 may then be constructed to have fewer gates than would be needed for a full 12 bits or greater multiply operation.

The $D_{out2}$ signal produced by the slopes LUT 420 also has fewer than 12 bits in one embodiment. In an alternate embodiment, an alternate translation value Yo (e.g., less than 12 bits wide) is used in place of the 12+ bits wide BkPt(y) signal for the purpose of reducing the number of bits needed by the multiplication function 450, in which case signal 451 represents m*(Y−Yo(y)). The slope-multiplied value signal 451 output from multiplier 450 next has a corresponding intercept value signal electronically added to it by adder 460. The added intercept value is selected within, and output by the intercepts LUT 430 according to the current Y range, which range is indicated on the Ain address bus 418. In the case where PWSL circuit 400 functions as a compressor, the output of adder 460 may be an 8-bit wide data signal representing the PWL output signal 462. In the case where circuit 400 is to function as a decompressor, the 12-bit and 8-bit bus width designations are swapped as appropriate throughout and the PWL output of adder 460 is instead a 12-bit data signal. Since the tuning circuit 405 can load a wide variety of coefficient signals into memory devices 410, 420 and 430, a large number of piecewise linear mapping functions can be implemented with use of the tunable mapping module 400. Additionally, the tunable mapping module 400 can have the values of its small number of breakpoints tuned so as to reduce the number of "used" high-precision input values (Y''' on axis 322 of module 320) that get undesirably lumped (323b) into a same 8-bits per subpixel value point on output axis 323 of FIG. 3. See also magnification 225' and the explanation therefore provided above.

For some embodiments, it may turn out that a purely PWL (piece-wise linear) approximation of compression curve 324 (FIG. 3) or of decompression curve 334 (in graph 330) is not accurate enough. It may turn out that a selectable one range among ranges R1-RN is better served by nonlinear mapping through a small LUT such as 470 while the other ranges among R1-RN can continue to be served by piece-wise linear mappings. Accordingly, in one embodiment, one or more LUT enable bits (LUTen bit(s)) are stored in each of breakpoint registers 411, 412, etc. For example, if two LUTen bits are stored in each breakpoint register then up to three different small LUTs may be selected for substitution or insertion of a correction value. A "00" default sequence may indicate no enabling of a substitution or correction LUT 470 for the corresponding range (R1-RN) while "01", "10" and "11" may select a particular one of three small LUT's (only one shown at 470) for use with the corresponding range. In the illustrated embodiment, the small nonlinear LUT 470 has substantially fewer input bits (e.g., 6 LSB's or less) than the 12 plus bits per Y data word used on bus 441. Hence the small nonlinear LUT 470 is significantly smaller in size than would be a mapping LUT having a full 12 plus bits for address input in correspondence with the precision allowed for by Y-input bus 441.

When the optional LUTen bit(s) are included in each breakpoint register, additional logic 417 (only one instance shown) is included in the range determining circuitry 419 for generating Range-enabled LUT-enabling/selecting bits (RenLUTen bit(s)). Here if a given one of ranges R1-RN is determined to be active and the corresponding LUTen bit(s) are other than all zeroes (e.g., "00") then the non-zero RenLUTen bit(s) are applied to MUX 475 for causing MUX 475 to select an input other than its default ("00") input that receives the PWL output signal 462. Thus, 8-bits wide LUT output signal 471 may be selected for use as the PWSL output signal 480 when the chosen range is active while the PWL output signal 462 is chosen by MUX 475 for all other ranges. Of course, the small LUT substitution scheme may be implemented for two or three selected ranges amongst R1-RN rather than for one such range. This will vary from application to application. Alternatively, small LUT 470 may have an output 471 of less than 8-bits which represent the LSB's of PWSL output signal 480 in the case where the exceptional one among ranges R1-RN is currently true. Alternatively, small LUT 470 may have its output signal 471 of optionally less than 8-bits added (not shown) as a correction signal to the PWL output signal 462 in the case where the exceptional one among ranges R1-RN is currently true. In the re-tunable version of module 400, tuning circuit 405 includes programming circuitry 409 operatively coupled to small LUT 470 for selectively reprogramming the output data values stored in small LUT 470. In one yet further variation on theme, one or more small LUTs such as 470 are used to add fine tuning corrections to the Dout2 and/or Dout3 signals in a given range and in response to a selected few bits (need not be the lowest of less significant bits) of the Y signal 441. Once the concepts of FIG. 4 are understood, persons skilled in the pertinent art may be able to quickly devise a number of different variations on the basic themes described here. Such variations are to be considered as part of the spirit and scope of the present disclosure.

In accordance with one variation, the devised breakpoints and/or other settings of the re-tunable version of module 400 are transmitted wirelessly or otherwise (e.g., via a secured or unsecured network connection) to a remote receiver and the received breakpoints and/or other settings are used automatically implement a counterpart decompressor of similar nature to the compressor of the sending side except that the breakpoints and associated slopes will generally be different so as to implement a reversing decompression algorithm. In accordance with one further variation, the devised breakpoints and/or other settings of the re-tunable version of module 400 are scrambled to be out of order and they are encrypted before being transmitted wirelessly or otherwise (e.g., via a secured or unsecured network connection) to a remote receiver and the received encrypted breakpoints and/or other settings are decrypted, descrambled to be in a correct reprocessing and loading order for the to be created counterpart decompressor and then the counterpart decompressor is created accordingly.

Referring now to FIG. 5A, it will be explained how module 400 of FIG. 4 may be designed or re-tuned to provide an operatively acceptable PWL or PWSL function for remapping (e.g., compressing) a supplied stream of high precision data. Like reference symbols and numbers having primes as their suffix, such as 260', etc., are used for elements of FIG. 5A which correspond to but are not necessarily the same as the elements represented by similar symbols and reference numbers in earlier described FIGS. 2-4. As such, introductory detailed descriptions of such elements are omitted here.

It is to be understood that the operations called for in the tuning system 500 of FIG. 5A may be carried out in a computer implemented simulation rather than with use of the actual hardware of module 400 and then afterwards the results of simulated tuning are used in the physical practice of module 400. Since the tuning operations may be carried out in offline simulation; meaning that the being-tuned PWL or PWSL unit 320' is not being used for real time storing of compressed in-process image data into a frame buffer (e.g., 130' of FIG. 3), there are no data processing bandwidth issues or time constraints that prevent the tuning process from consuming a relatively long time (e.g., hours or days, if need be). In the case of tuning system 500, an ideal or practical, test pattern RGB image data file 260' is provided (but it does not have to be an image file, it can be set of high precision data words which are to be all or partially compressed into corresponding low precision data words). The so-provided test pattern data file 260', if it is an image file should be so filled with image data such that each color channel (e.g., RGBW) will have all possible gray scale levels (e.g., 0-255 for a given application) passed there-through. Test pattern file 260' need not be a sRGB file. It could represent image data that has been saved under a different implied gamma function. In one embodiment, identity of the implied output-side gamma function (e.g., 220 of FIG. 2) is an input factor that tuning circuit 405 of FIG. 4 responds to when selecting the tuning coefficients (from memory 406) that are to be loaded into modules 410, 420, 430 and into optional small LUT 470. In one exemplary instance of test pattern file 260', the intentionally formulated image data in file 260' may have a predetermined pattern such as just 10 instances of R=0 within it, 11 instances of R=1, 12 of R=2, ... 11 of G=1, ... 11 of B=1 ... and 5 of B=255. In other words, each of all possible gray scale levels (0-255) occurs at least once and the number of instances of each is somewhat unique although it need not be completely unique (e.g., there can be 11 instances of R=251 as well as 11 of R=1). The idea is to define a histogram of data expected at output 132" of the being-tuned PW(S)L module 320'. If all operates properly within the simulated data flow through modules 230', 252' and 320', then the 8-bits per subpixel output 132" should exhibit the same histogram or predetermined frequency of occurrences of each gray level that was input into the system 500 as input stream 262'. And; there should be no gaps at the output 510. Each of the "used" 256 number point slots should be filled with its expected number of uses. (As noted above, the present disclosure is not limited to compression of image files and other data sets may be alternatively supplied for compression of part or all of the domain of the supplied data set. In one such embodiment, the compressed part of the domain is constituted by telecommunication symbols that are more frequently transmitted that are other members of the domains set of symbols/characters through a communications channel of limited bandwidth. Bandwidth strain on the channel may be reduced by sending the more often used symbols/characters through in compressed form and then decompressing them at the receiver end.)

Still referring to FIG. 5A, output 262' of the specially-filled test pattern file 260' successively feeds all instances of a corresponding color channel (say Red) into an input side gamma converter 230' (where 230' may be implemented as a high accuracy LUT that outputs 12 bits or more per subpixel for the post-linearization output signals 251'). Optionally, output 262' is also coupled to a symbol usage counter 503 where the latter is initialized to zeroes in all its 256 counter stages and the latter then generates a histogram by counting the number of received instances of each gray level (e.g., 10 instances of R=0, 11 of R=1 and so on) or each instance of other kinds of symbols if the latter are not luminance representing symbols. All 256 gray scale levels will be "used" in the case of an 8-bits/subpixel system. If instead it were a 7-bits/subpixel system, then all 128 gray scale levels will be "used" and so forth.

When the full, test input file 260' has been passed through the input side gamma converter 230', all counter positions in the usage counter 503 should be non-zero. All 256 number points are therefore "used" at this stage of the tuning process. This full-usage state of affairs is represented in FIG. 5A by counter 503 having its entire area filled with hatching (as opposed to the graphic representation used for the partially filled, next usage counter 505 which will be described shortly).

Output signal stream 251' of the test-file driven input side gamma converter 230' successively supplies all of its 12 bits wide (or wider, or slightly narrower) data samples to a computer simulated version 252' of the first image data processing engine 252 used in FIG. 2. (Alternatively, 252' can be the actual engine hardware.) In one embodiment, of system 500 however, the first image data processing engine 252' is simulated as a unity transformation 252a' where data out 261' equals data in 251'. What this means is that all the "used" 12-bit number values at input side 251' (there will be just 256 of them in this example) will have exactly same corresponding and "used" 12-bit number values at output side 261' of simulated module 252'.

Output signal stream 261' of the specially-driven first image data processing engine 252' may be coupled to a second usage counter 505 (histogram generator) where the latter is initialized to zeroes in all of its $2^{12}$ counter stages and the latter then counts the number of received instances of each 12-bits expressed, gray level (e.g., 10 instances of R=0000, 11 of R=0001 and so on). In an alternate embodiment, the second usage counter 505 does not count all instances of each high precision gray level but instead flips a single usage bit one way; from 0 to 1, for each of $2^{12}$ instance occurrence detecting cells provided therein. For one embodiment, the second usage counter 505 is hypothetical rather than real. It need not be implemented if it is already known that all 256 of the "used" number points at the input of module 252' will reappear exactly one-for-one as 256 "used" number points at the output 261' of module 252'. Nonetheless, hypothetical deployment of counter 505 is described here for better understanding of the concept regarding "used" and "unused" data values mentioned earlier in this disclosure. In either case, whether counter 505 is real or hypothetical, and whether counter 505 counts instances (generates a histogram) or just flips one-way, from 0 to 1, for one or more or all of the gray levels, after all of the response outputs 261' of the simulated first image data processing engine 252' have been recorded by the second usage counter 505, the counter 505 should provide a pattern of "used" and "unused" data values. "Unused" data values are identified by their entries in counter 505 still being a zero. The "used" and "unused" 12 bits wide (or wider, or slightly narrower) data values which are respectively output and not-output by image data processing engine 252' need not be the same as the "used" and "unused" 12 bits wide data values (high precision values) respectively output and not-output by the input side gamma converter 230'. For example, the image data processing engine 252' may change values for some of the "used" 12 bits wide input data values received from the input side gamma converter 230' so that usage histogram 505 does not exactly match with the "used" number points on Y" axis 233' of module 230'. Of course, in the case where unity transformation 252a' is utilized, usage histogram 505 should exactly match with the "used" number points on Y" axis 233'.

Output signal stream 261' of the specially-driven first image data processing engine 252' is next coupled to a being-tuned version 320' of the PieceWise Linear (PWL) or Piece-Wise Substantially Linear (PWSL) compression module of FIG. 3 (and optionally also that of FIG. 4). If the PW(S)L compression module 320' has been tuned so that its kinks (e.g., breakpoints) do not create undesired artifacts, then a third usage counter 510, which is driven by the 8 bits wide output port 132" and which has 256 usage count or occurrence detect cells should be essentially filled up (should have no or only a small number, e.g., 3 or less of unused slots) and the histogram, if any should substantially match that of usage counter 503. A gaps and/or usage shortages detector 520 operatively couples to the third usage counter 510, and after processing of file 260' completes; the detector 520 scans through the third usage counter 510 to see if there are any undesired gaps or undesired short counts or over counts for certain ones of the expected gray level values in the range 0-255. In one embodiment, if there are to be gaps (one shown) in histogram 510, it is preferable for the gaps to appear within the brightest end of the 8-bits/subpixel number line or for colors that are part of a natural mix of colors rather than a computer-created monotonic picture area because the human visual system is less sensitive to artifacts in that high brightness end than in the least bright end of the gray scales spectrum and because the human visual system is less sensitive to artifacts within an area having a natural mixture of different colors than an unnatural area that substantially consists of one color or a colored area having a relatively low spatial variation frequency. The results stored in the third usage counter 510 are fed either to a tuning computer 530 or to a human designer who with the aid of a computer, is designing system 400 of FIG. 4 or the like. If the tuning computer or human designer 530 determines that the being-tuned version 320' of the PW(S)L compression module 320' needs to be further tuned (because there are gaps in 510, or too many gaps, or placed at the wrong end of the gray scales spectrum) or corresponding to an image area having a relatively low spatial variation frequency, the tuning computer or user 530 will alter one or more of the coefficients in boot memory 406' of the PWL module 320' and rerun the process again by first resetting all the usage counters 503, 505, 510 to zeroes and running a repeat copy of file 260' through units 230', 252' and 320' in hopes of getting better results (via trial and error). Getting better results in usage counter 510 means here, that there will be fewer gaps and/or if there must be gaps, they are pushed more toward into the brighter end (higher end) of the numbers line covered by usage counter 505 or into a numbers domain that does not appear within an image area having a relatively low spatial variation frequency.

FIG. 5B illustrates one machine-implemented algorithm 550 that may be automatically executed by a tuning computer such as 530. For one class of embodiments, one or more of the break points in the being-tuned PWL 320' is defined as a vital break point (e.g. the white point) that cannot be changed and has to maintain a specific predefined position in the plot space 320 of FIG. 3. Also, one or more of the line segments in the PWL plot 325 (e.g., of range 323d) may be designated as requiring a specific and predetermined slope where the latter is denoted as a vital slope over a corresponding vital range. The reasons for having such vital points and/or slopes may be various. For example, if the image data input file is an sRGB formatted one, then per industry standard, the low valued end of the sRGB input side gamma conversion function has a prespecified slope (of unity, meaning no compression) and a predefined range where the linear transformation is maintained, and thus it may be desirable to exactly replicate at least that slope if not also over that same range. As such, in step 551, the vital break points and/or vital slopes are identified and logically designated as non-modifiable data items. Then, in step 553, one or more of the remaining and modifiable break points are shifted in a picked direction for reducing the number of detected gaps (detected by detector 520) and/or pushing gaps to higher brightness values and/or reducing the amount of histogram pattern mismatch between the occurrence counts in counter 510 as compared to counter 503 and thus converging on an errors minimizing set of coefficients. The tuning computer 530 may maintain a trial and error history log(not shown) that tells it what numbers of gaps and/or amounts of pattern mismatches occurred when a break point was moved one way as opposed to another or when a non-linear small LUT (e.g., 470) was substituted for a given range (R1-RN). By shifting the PW(S)L design in various directions and by various amounts, the breakpoint locations and other coefficients (e.g., slopes, y-intercepts) can be converged toward a set that provides minimization of detected error (e.g., fewest gaps and/or best histogram pattern match between 510 and 503).

In step 555 it is determined whether an error minimum condition is already logged and whether further trial and error efforts are not substantially improving over that found error minimum condition. If Yes, exit step 559 loads the found minimizing set of coefficients into memory 406' of the tunable version of module 400. If No, control is returned from step 555 to step 553 and another break point shift is tried.

Referring to FIG. 6A, it will now be explained how the decompression version of the tunable module 400 of FIG. 4 or an 8-to-12 bit conversion LUT (330") may be tuned to provide an operative inverse PW(S)L function or nonlinear function for decompressing the pre-compressed data produced by tuned module 400. Like reference symbols and numbers having double primes as their suffix, such as 252", etc., are used for elements of FIG. 6A which correspond to but are not necessarily the same as the elements represented by similar symbols and reference numbers in earlier described FIGS. 2-4 and 5A. As such, an introductory detailed description of such elements is omitted here. For sake of avoiding illustrative clutter, the entire data path including source file 260' and gamma converter 230' are not shown. It is understood that input line 251" may receive its 12 bits wide (or wider, or slightly narrower) data from the picked input side gamma converter 230' (picked to match the implied conversion of the input data file.

The situation in FIG. 6A is different from that of FIG. 5A. If differently valued, "used" ones of high precision number points were undesirably lumped together into a single 8-bits wide representative code by compression module 320", they cannot be de-lumped by decompression module 330". The discrimination between the two or more lumped together, "used" high precision number points is lost. There is only the one 8-bits wide representative code that is now to be expanded into a corresponding 12-bits wide (or wider or slightly narrow) new code by decompression module 330". The question for the system designer in FIG. 6A is what to do in the case of lumping together of used high precision number points. An ancillary question is how to detect in the first place the occurrence of such undesired lumpings together. For the latter question, design or tuning system 600 provides the user with automated tools for identifying a first used high precision number point that has been lumped together with another high precision number point into one 8-bit code by action of compression module 320". Unlike the case in FIG. 5A where usage counter 505 was optional, in the tuning/design-assisting system 600 of FIG. 6A, corresponding usage counter 605 should not be optional. It operates at least in the same way that was described for optional counter 505 for purpose of identifying used and unused high precision number points (e.g., in the discrete number points domain of 0 to $2^{12}-1$ for example) and thus description of its operation will not be repeated again here.

Output 261" of the test pattern-driven first image data processing engine 252" (or of the unity transform 252a") is coupled to the already tuned and optimized version 320" of the Piece Wise Substantially Linear (PW(S)L) compression module. From the coefficients stored in memory 406" of PWSL 320", an inverse-producing, first computer or executing computer program 630 had earlier computed corresponding coefficients for an inverse PWSL function or an inverse LUT function 330" and had stored these simulation driving coefficients in the memory 406''' of inverse and still-to-be-tuned decompression PWSL 330" or decompression LUT 330". Because decompression module 330" has a substantially smaller number of input terminals (e.g., 8 instead of 12) than does the compression module 320", when the actual compression/decompression hardware is realized, the decompression module 330" can be implemented as a relatively small sized LUT and thus resort to use of PWL mimicry is generally not needed for the decompression process (330"). However, in some special cases where circuit size is at a premium or constant retuning is desirable, it may nonetheless be desirable to implement decompression module 330" as a tunable PWL or PWSL decompression module.

Output signal stream 132" of the already tuned and optimized PWL compressor 320" is fed to the input of the still-to-be-tuned PW(S)L de-compressor 330". Output stream 132" may optionally be applied to an optional usage counter 610 which keeps track of usage occurrences in, for example, the 0-255 value domain. Presence of a usage gap in histogram 610 may indicate to the designer that lumping together has occurred and that a first high precision number point that should have been assigned to the unused 8-bit code was instead lumped into a used 8-bit code that is assigned to a different, second high precision number point. This is not always true, but it is a possibility.

Output signal stream 263" of the so-driven and the possibly still-to-be-further-tuned PW(S)L or LUT de-compressor 330" couples to yet another usage counter 640, where the latter counter 640 keeps track of usage and non-usage occurrences in the 0 to $2^{12}-1$ high precision values domain. The 12-bits (plus or minus delta) wide output signals 263" of decompression module 330" need not be of the same bit width as the high precision input signals 261" supplied to compression module 320". If the decompression output 263" is of a higher precision (e.g., 13 bits, 14 bits) or of a slightly lower precision (e.g., 10 bits, 11 bits), then the designer may wish to make some adjustments to the LSB's of higher or lower precision output signals 263" by adjusting the decompression LUT or decompression PW(S)L unit 330" since such may not be fully accounted for by the automated inverse generator 630.

If the LUT or PW(S)L de-compressor 330" is providing a perfect inverse of the operations performed by forward compressor 320" (and the output precision is the same (e.g., 12-bits per subpixel) as the input to the compression module 320", then the gap locations (unused number points) defined in usage counter 640 after all input file test pattern signals are run through should match the gaps locations in usage counter 605. The occurrence numbers (meaning histogram numbers, if tracked) of not empty value slots in usage counter 640 should match the occurrence numbers (if tracked) found in usage counter 605. Mismatch detector 645 operatively couples to both of usage counter 640 and 605 and automatically determines at least the degree to which the gap locations match if not also determining the degree to which the patterns of occurrence numbers (usage histograms) match. Degree of matching or mismatching may be measured by use of mathematical correlation functions or the like. If a mismatch is present, that may indicate to the designer that two or more used high precision number points represented by input data 261" were undesirably lumped together by compression module 320". Once the lumped ones of the used high precision number points are identified, the question presented to the designer is what to do about the situation; short of returning compression module 320". The designer may elect to pick a compromise high precision number point midway between the lumped together input points. Or the compromise might be weighted closer to one used high precision number point than the other based on the histogram information provided by usage counter 605.

The steps of fine tuning higher or lower precision output signals 263" or of arriving at a compromise new high precision output signal in response to an 8-bit code that represents two lumped together, used high precision number points is represented as being performed in or with aid of a quantization error reducing computer 650 or simply by the human designer 650. The user and/or computer 650 receive the match and mismatch information from mismatch detector 645 and the input usage histogram from counter 605. The user and/or computer 650 then determine how to handle each situation by means of fine tuning the decompression LUT or decompression PW(S)L module 330" as deemed appropriate for the given application. What is appropriate for one application may not be appropriate for another.

FIG. 6B illustrates an algorithm 660 that may be automatically executed by a quantization error reducing computer/program 650 or manually executed by a human designer of the de-compressor LUT or PW(S)L module 330". For one class of embodiments, one or more of the break points in the being-tuned decompression PW(S)L module 330" may be defined as a vital break point that cannot be changed and has to maintain a specific predefined position (e.g., white point) in the plot space 330 of FIG. 3. Also, one or more of the line segments in the PW(S)L decompression plot may be designated as requiring a specific and predetermined slope where the latter is denoted as a vital slope. The same could be done for LUT output values (e.g., defining one or sets of them as constrained). Thus, in step 661, the vital break points and/or vital slopes are identified and logically designated as non-modifiable data items. Then, in step 663, one or more of the remaining and modifiable break points are shifted by trial and error approach with the goal of reducing quantization errors in the output signals 263" output by the decompression module 330" in response to the 8-bit codes supplied form unit 320".

In step 665 it is determined whether all 256 or fewer of the modifiable outputs produced by LUT or PW(S)L 330" have been considered and adjusted. If Yes, exit step 669 loads the found quantization error minimizing set of coefficients or LUT output values into a memory 406" of the implemented version of module 330". If No, control is returned from step 665 to step 663 and another change of values is considered.

While the disclosure has focused on PW(S)L implemented compression for image data such as when transforming form the 12-bits per subpixel domain to the 8-bits per subpixel domain, it is to be understood that the teachings provided herein may have broader applicability; particularly when the number of bits (e.g., 12 bits) used for the high precision domain can be varied somewhat and then the identities of used and not-used, high precision number points shifts over time and undesirable lumping together of used number points may occur if the initial PW(S)L transformation is not repeatedly fine tuned to reduce the number or eliminate the occurrence of lumping together of used high precision number points during the data compression process. As mentioned, the PW(S)L compression techniques discussed herein may be applied for compression of high precision data before it is transmitted for example to a remote receiver by way of a communications channel having limited bandwidth. In one variation, the high precision number line is parsed into a first set consisting of most often used, high precision number values (most frequently found characters or symbols in a transmission stream) and a second set consisting of remaining, less often used high precision number values and a third set consisting of never used high precision number values. Then a compression curve (e.g., a PW(S)L curve) is devised for the first set of most often used, high precision number values with care being take to assure that no two such numbers become lumped together during compression mapping. The most often used, high precision number values can then be transmitted in compressed format (with aid for example of a compression indicating bit being concatenated on) while the other, less often used high precision number values are transmitted in non-compressed format (with the concatenated on, compression indicating bit being set to false). If a plurality of compression indicating bits are so concatenated onto each transmitted word or packet, then multiple compression curves could be used with the compression indicating bits identifying the correct decompression curve to be used (or none at all) at the receiving end of the transmission channel. In one embodiment, automated determination of whether to set the compression-is-true bit to false or not comprises the following. A signal representing a high precision number point is input into a tuned PW(S)L implemented compressor such as that of FIG. 4. The output of the tuned PW(S)L implemented compressor is fed into a counter-part tuned PW(S)L implemented decompressor. The output signal obtained from the decompressor is compared to the high precision number point that was originally input into the tuned PW(S)L implemented compressor. If they are the same, the compression-is-true bit is set to true and it is transmitted along with the compressed version (low precision version) of the corresponding signal to the remote receiving device. On the other hand, if they are not the same, the compression-is-true bit is set to false and it is sent along with the non-compressed version (high precision version) of the corresponding signal to the remote receiving device. At the receiver end, the compression-is-true bit is used to automatically determine whether the accompanying data word is a compressed one or not. If yes, the compressed data word is passed through an appropriate decompression process to obtain its higher precision counterpart.

The present disclosure is to be taken as illustrative rather than as limiting the scope, nature, or spirit of the subject matter claimed below. Numerous modifications and variations will become apparent to those skilled in the art after studying the disclosure, including use of equivalent functional and/or structural substitutes for elements described herein, use of equivalent functional couplings for couplings described herein, and/or use of equivalent functional steps for steps described herein. Such insubstantial variations are to be considered within the scope of what is contemplated here. Moreover, if plural examples are given for specific means, or steps, and extrapolation between and/or beyond such given examples is obvious in view of the present disclosure, then the disclosure is to be deemed as effectively disclosing and thus covering at least such extrapolations.

Reservation of Extra-Patent Rights, Resolution of Conflicts, and Interpretation of Terms After this disclosure is lawfully published, the owner of the present patent application has no objection to the reproduction by others of textual and graphic materials contained herein provided such reproduction is for the limited purpose of understanding the present disclosure of invention and of thereby promoting the useful arts and sciences. The owner does not however disclaim any other rights that may be lawfully associated with the disclosed materials, including but not limited to, copyrights in any computer program listings or art works or other works provided herein, and to trademark or trade dress rights that may be associated with coined terms or art works provided herein and to other otherwise-protectable subject matter included herein or otherwise derivable herefrom.

If any disclosures are incorporated herein by reference and such incorporated disclosures conflict in part or whole with the present disclosure, then to the extent of conflict, and/or broader disclosure, and/or broader definition of terms, the present disclosure controls. If such incorporated disclosures conflict in part or whole with one another, then to the extent of conflict, the later-dated disclosure controls.

Unless expressly stated otherwise herein, ordinary terms have their corresponding ordinary meanings within the respective contexts of their presentations, and ordinary terms of art have their corresponding regular meanings within the relevant technical arts and within the respective contexts of their presentations herein. Descriptions above regarding related technologies are not admissions that the technologies or possible relations between them were appreciated by artisans of ordinary skill in the areas of endeavor to which the present disclosure most closely pertains.

Given the above disclosure of general concepts and specific embodiments, the scope of protection sought is to be defined by the claims appended hereto. The issued claims are not to be taken as limiting Applicant's right to claim disclosed, but not yet literally claimed subject matter by way of one or more further applications including those filed pursuant to 35 U.S.C. §120 and/or 35 U.S.C. §251.

What is claimed is:

1. A circuit-implemented data compression method that converts a first set of relatively-wide multi-bit signals representing a corresponding first set of used high precision number points into a second set of relatively-narrower multi-bit signals representing substantially the same first set of used high precision number points but with a fewer number of bits per represented number point, and where the first set of used high precision number points are interspersed along a hypothetical high precision number line and adjacent to same precision but unused number points, the circuit-implemented data compression method comprising:

(a) determining whether a received one of the relatively-wide multi-bit signals belongs to a range among a predefined group of high precision number ranges and if yes, identifying the range, wherein one or more of the ranges of the predefined group of high precision number ranges has a predefined linear transformation function pre-associated with it; and (b) identifying the predefined linear transformation function pre-associated with the identified range and using the identified linear transformation function to responsively generate a corresponding relatively-narrow multi-bit signal that is representative of the high precision number point of the received relatively-wide multi-bit signal;

wherein the respective predefined linear transformation functions each have coefficients identifying a respective and tunable linear transformation slope and begin or end-of-range points and the coefficients are set so as to avoid or minimize lumping together during compression, of two or more of the used high precision number points into a same low precision number point defined by a relatively-narrow multi-bit signal that is responsively generated by said data compression method.

2. The circuit-implemented data compression method of claim 1 wherein said using of the identified linear transformation function comprises:

identifying a predefined, magnitude-translating value pre-associated with the identified range and responsively generating a difference signal representing a difference between the value of the received relatively-wide multi-bit signal and the range-associated magnitude-translating value;

identifying a predefined slope value pre-associated with the identified range and responsively generating a product signal representing the value of the difference signal multiplied by the identified slope value; and identifying a predefined intercept or intercept-equivalent value pre-associated with the identified range and responsively generating a piece-wise transformed signal representing a sum of the value of the product signal and of the identified intercept value or identified intercept-equivalent value.

3. The circuit-implemented data compression method of claim 1 and further comprising:

selectively and automatically substituting for one of the predefined linear transformation functions, a nonlinear transformation function defined by a relatively small lookup table (LUT) having a fewer number of input terminals than said number of bits per signal of the relatively-wide multi-bit signals, where said substituting includes using the relatively small LUT to responsively generate the corresponding relatively-narrow multi-bit signal that is representative of the high precision number point of the received relatively-wide multi-bit signal.

4. The circuit-implemented data compression method of claim 3 wherein:

each of said relatively-wide multi-bit signals has 10 or more bits;

each of said relatively-narrow multi-bit signals has 8 or less bits; and the number of input terminals of the relatively small LUT is 8 or less.

5. The circuit-implemented data compression method of claim 4 wherein:

each of said relatively-wide multi-bit signals has 12 or more bits; and the number of input terminals of the relatively small LUT is 6 or less.

6. The circuit-implemented data compression method of claim 1 wherein:

each of said relatively-wide multi-bit signals has 10 or more bits; and each of said relatively-narrow multi-bit signals has 8 or less bits.

7. The circuit-implemented data compression method of claim 1 wherein:

each of said relatively-wide multi-bit signals has 12 or more bits.

8. The circuit-implemented data compression method of claim 1 wherein said predefined linear transformation functions combine to define a piece-wise linear approximation of a predefined output-side gamma function implicitly associated with an image data storing file that stores image data signals of same bit width as said relatively-narrow multi-bit signals.

9. The circuit-implemented data compression method of claim 1 and further comprising:
  storing said responsively generated and corresponding relatively-narrow multi-bit signals in a frame buffer of an image displaying system.

10. The circuit-implemented data compression method of claim 1 and further wherein, said relatively-wide multi-bit signals are received from an image data pre-processor that performs a subpixel rendering operation to thereby generate the relatively-wide multi-bit signals.

11. An automatically implemented method of assembling data in a frame buffer to represent a composite image for display, wherein the frame buffer stores data words as individually addressable data items each consisting of a first number of bits, the method comprising:
  (a) receiving image data signals representing different objects that are to be simultaneously displayed on a target display device;
  (b) pre-processing at least one subset of the received image data signals using a first pre-processing operation that operates on signals whose data items each consists of a second number of bits greater than the first number of bits, where the second number of bits is used to linearly represent values of physical magnitudes during the pre-processing, where the signals having the second bits per data item are derived from said at least one subset of the received image data signals;
  (c) compressing the pre-processed data signals by encoding pre-processed data signals that have the second number of bits per data item to become correspondingly encoded pre-processed data signals having the first number of bits per data item, where said compressing uses a non-causal and tunable compression algorithm;
  (d) storing the encoded pre-processed data signals in the frame buffer; and
  (e) allowing other image data signals that have not been pre-processed by the first pre-processing operation and that also have said first number of bits per data item to become stored in the frame buffer at addresses adjacent to the data signals that have been pre-processed by the first pre-processing operation.

12. The method of claim 11 wherein said compressing of the pre-processed data signals comprises:
  (c.1) determining whether each to-be-encoded, pre-processed data signal belongs to a range among a predefined group of high precision number ranges and if yes, identifying the range, where each range of the predefined group of high precision number ranges has a predefined linear transformation function pre-associated with it; and
  (c.2) identifying the predefined linear transformation function pre-associated with the identified range and using the identified linear transformation function to responsively generate a corresponding encoded pre-processed data signal having the first bit width to represent the high precision number point of the wider in bit width, pre-processed data signal.

13. The method of claim 12 wherein:
  the respective predefined linear transformation functions each have a respective slope and end-of-range points set so as to avoid lumping together during compression, of two or more of the used high precision number points into a same low precision number point defined by a corresponding encoded pre-processed data signal.

14. The method of claim 12 wherein said using of the identified linear transformation function comprises:
  identifying a predefined translation value pre-associated with the identified range and responsively generating a difference signal representing a difference between the value of the to-be-encoded, pre-processed data signal and the range-associated translation value;
  identifying a predefined slope value pre-associated with the identified range and responsively generating a product signal representing the value of the difference signal multiplied by the identified slope value; and
  identifying a predefined intercept value pre-associated with the identified range and responsively generating a piece-wise transformed signal representing a sum of the value of the product signal and of the identified intercept value.

15. The method of claim 12 wherein:
  the first number of bits per data item is 8 or less bits; and
  the second number of bits per data item is 10 or more bits.

16. The method of claim 12 wherein:
  the first number of bits per data item is at least 2 bits smaller than the second number of bits per data item.

17. The method of claim 15 wherein:
  the first number of bits per data item is at least 4 bits smaller than the second number of bits per data item.

18. The method of claim 11 wherein:
  the first number of bits per data item is at least 4 bits smaller than the second number of bits per data item.

19. A non-causal and tunable compression circuit that converts a first set of relatively-wide multi-bit signals representing a corresponding first set of used high precision number points into a second set of relatively-narrow multi-bit signals representing substantially the same first set of used high precision number points, where the signals of the second set of relatively-narrow multi-bit signals each have a substantially fewer number of bits per signal than the corresponding relatively-wide multi-bit signal of the first set of multi-bit signals, and where the first set of used high precision number points are interspersed along a hypothetical high precision number line and among same precision but unused number points, the circuit comprising:
  (a) a tunable range determiner that determines whether a received one of the relatively-wide multi-bit signals belongs to a range among a predefined group of high precision number ranges and if yes, that produces a range identifying signal identifying the range, where each range of the predefined group of high precision number ranges has a predefined linear transformation function pre-associated with it; and
  (b) a linear transformer responsive to the range identifying signal and structured to apply the predefined linear transformation function pre-associated with the identified range to the received one of the relatively-wide multi-bit signals so as to thereby responsively generate a corresponding relatively-narrow multi-bit signal that is representative of the high precision number point of the received relatively-wide multi-bit signal;
  wherein the respective predefined linear transformation functions applied by the linear transformer, each have respective coefficients representing slope and one or more end-of-range points that are set so as to avoid or minimize a lumping together during compression, of two or more of the used high precision number points into a same low precision number point defined by a relatively-narrow multi-bit signal that is responsively generated by said linear transformer.

20. The non-causal compression circuit of claim 19 wherein the linear transformer comprises:
- a first lookup structure having first storage for storing a plurality of predefined translation values and having a first identifier operatively coupled to the first storage and configured for identifying one of the stored predefined translation values as being associated with the identified range;
- a first combiner operatively coupled to the first lookup structure and configured to responsively generate a difference signal representing a difference between the value of the received relatively-wide multi-bit signal and the range-associated translation value identified by the first lookup structure;
- a second lookup structure having second storage for storing a plurality of predefined slope values respectively associated with the predefined ranges and having a second identifier operatively coupled to the second storage and configured for identifying one of the stored slope values as being associated with the identified range;
- a second combiner operatively coupled to the second lookup structure and configured to responsively generate a product signal representing the value of the difference signal multiplied by the identified slope value identified by the second lookup structure;
- a third lookup structure having third storage for storing a plurality of predefined intercept values respectively associated with the predefined ranges and having a third identifier operatively coupled to the third storage and configured for identifying one of the stored intercept values as being associated with the identified range; and
- a third combiner operatively coupled to the third lookup structure and configured to responsively generate a piece-wise transformed signal representing a sum of the value of the product signal and of the identified intercept value.

21. An image data processing system that uses image defining signals including low precision image defining signals and high precision image defining signals, where the high precision image defining signals each uses a greater number of bits for defining a corresponding data value than used by the low precision image defining signals and where the image data processing system comprises:
- (a) a first image data processor that processes a first group of the high precision image defining signals and produces a corresponding second group of the high precision image defining signals that define used high precision values;
- (b) a piecewise linear and tunable data compression module coupled to the first image data processor and structured to convert the second group of the high precision image defining signals produced by the first image data processor into a corresponding third set of low precision data signals on a substantially one-to-one mapping basis which substantially one-to-one mapping basis is that seen for the used ones of the high precision data values and for used ones of the corresponding and one-for-one mapped low precision data values;
- (c) a data storage device and/or a data transmission device coupled to receive the third set of low precision data signals produced by the piecewise linear data compression module and to output all or a subset of the received low precision data signals as a fourth set of low precision data signals; and
- (d) a data decompression module coupled to the data storage device and/or to the data transmission device for receiving the fourth set of low precision data signals, where the data decompression module is structured to convert the fourth set of low precision data signals into a corresponding fifth set of high precision data signals on a substantially one-to-one mapping basis.

22. The image data processing system of claim 21 wherein said data storage device and/or a data transmission device includes a frame buffer that stores displayable data words where the stored and displayable data words each have the number of bits per word used by said low precision image defining signals and where the frame buffer can be written to in response to a data processor other than the first data processor.

23. The image data processing system of claim 21 wherein said data decompression module includes a piecewise linear data decompression module.

24. The image data processing system of claim 21 wherein said piecewise linear data compression module has one or more tunable breakpoints.

25. The image data processing system of claim 21 wherein said piecewise linear data compression module comprises:
- (b1) a breakpoints storing memory;
- (b2) a slopes storing lookup table;
- (b3) an intercepts storing lookup table; and
- (b4) a range determining circuit, coupled to the breakpoints storing memory and coupled to receive a high precision data signal and configured to determine which of plural value ranges the received high precision data signal belongs to where the plural value ranges are defined by break point signals stored in the breakpoints storing memory.

26. The image data processing system of claim 25 wherein said piecewise linear data compression module further comprises:
- (b5) a subtractor coupled to receive as inputs, the high precision data signal received by the range determining circuit and an offset signal output by the breakpoints storing memory in response to a range-indicating signal output by the range determining circuit, the subtractor being configured to produce a translated value signal representing a difference between the value of the received high precision data signal and the value of the offset signal;
- (b6) a multiplier coupled to receive as inputs, the translated value signal and a slope signal output by the slopes storing lookup table in response to the range-indicating signal, the multiplier producing a product signal representing the translated value multiplied by the slope signal; and
- (b7) and adder coupled to receive as inputs, the product signal and an intercept signal output by the intercepts storing lookup table in response to the range-indicating signal, the adder producing a result signal representing the sum of the product signal and the intercept signal.

27. The image data processing system of claim 26 wherein the number of bits used by the translated value signal is less than the number of bits used by the high precision data signal received by the range determining circuit.

28. The image data processing system of claim 26 wherein the offset signal output by the breakpoints storing memory in response to the range-indicating signal is one of the breakpoints stored in the breakpoints storing memory.

29. The image data processing system of claim 21 wherein:
- (a1) said first image data processor performs area resampling operations for generating displayable image data that can be directly displayed by a display screen having subpixels organized in a non-RGB stripes format.

30. The image data processing system of claim 29 wherein the non-RGB stripes format is a Pentile format.

31. The image data processing system of claim 29 wherein the non-RGB stripes format is a RGBW format.

32. The image data processing system of claim 29 and further comprising:
(e) a second image data processor that processes high precision data signals output by the data decompression module.

33. The image data processing system of claim 32 wherein the second image data processor adjusts the high precision data signals processed by it to accommodate for dynamic change of display backlighting.

34. A machine-implemented method performed in an image data processing system that uses image defining signals including low precision image defining signals and high precision image defining signals, where the high precision image defining signals each uses a greater number of bits for defining a corresponding data value than used by the low precision image defining signals, said machine-implemented method comprising:
(a) processing a first group of the high precision image defining signals in a first image data processor so as to thereby produce a corresponding second group of the high precision image defining signals that define used high precision values;
(b) converting the second group of the high precision image defining signals produced by the first image data processor into a corresponding third set of low precision data signals on a substantially one-to-one mapping basis with use of a piecewise linear and tunable data compression module that is coupled to the first image data processor and is structured to convert input high precision value defining signals into corresponding low precision value defining data signals on a substantially one-to-one mapping basis which substantially one-to-one mapping basis is that seen for the input ones of the high precision data values and for resulting ones of the corresponding and one-for-one mapped low precision data values;
(c) coupling at least a subset the third set of low precision data signals to a data decompression module which is structured to convert input low precision value-defining data signals into a corresponding high precision value-defining data signals on a substantially one-to-one mapping basis.

35. The method of claim 34 wherein:
(c1) said coupling includes storing the third set of low precision data signals in a memory device prior to forwarding at least a subset of the stored third set of low precision data signals to the data decompression module.

36. The method of claim 35 wherein said memory device serves a frame buffer that stores displayed image data including displayed image data generated by a data processor other than said first image data processor.

37. The method of claim 34 wherein:
(c1) said coupling includes transmitting the third set of low precision data signals through a signal transmission channel prior to forwarding at least a subset of the channel transmitted third set of low precision data signals to the data decompression module.

38. The method of claim 34 wherein said data decompression module includes a piecewise linear data decompression module.

39. The method of claim 34 wherein said piecewise linear data compression module has one or more tunable breakpoints and the method includes tuning at least one of the tunable breakpoints.

40. The method of claim 34 wherein said first image data processor reformats the first group of the high precision image defining signals for display by a display screen having subpixels organized in a non-RGB stripes format.

41. The method of claim 40 wherein the non-RGB stripes format is a Pentile format.

42. The method of claim 41 wherein the non-RGB stripes format is a RGBW format.

43. A machine-assisted tuning method performed in an image data processing system that uses image defining signals including low precision image defining signals and high precision image defining signals, where the high precision image defining signals each uses a greater number of bits for defining a corresponding data value than used by the low precision image defining signals, said machine-implemented method comprising:
(a) first supplying as low precision image defining test signals, all possible gray scale levels of a first color channel to an input-side gamma conversion module to thereby produce a corresponding first set of high precision image defining signals;
(b) second optionally supplying the first set of high precision image defining test signals to a first image data processing engine or a computerized simulation thereof so as to thereby produce a corresponding second set of high precision image defining signals output by the first image data processing engine or by the computerized simulation thereof, where the second set of high precision image defining signals define used high precision values if the first image data processing engine or a computerized simulation thereof is optionally utilized and where otherwise, the first set of high precision image defining signals define the used high precision values;
(c) third supplying the set of high precision image signals defining used high precision values to a piecewise linear data compression module having tunable breakpoints so as to thereby produce a set of hopefully one-to-one mapped low precision image defining signals corresponding to the used high precision values;
(d) detecting whether the hopefully one-to-one mapped low precision image defining signals produced by the tunable piecewise linear data compression module populate all possible gray scale levels of the first color channel as did the low precision image defining test signals; and
(e) if said detecting indicates that not all possible gray scale levels of the first color channel have been populated by the set of hopefully one-to-one mapped low precision image defining signals, changing at least one of the tunable breakpoints in said tunable piecewise linear data compression module in response and repeating said steps (a) through (d).

* * * * *